(12) United States Patent
Ota et al.

(10) Patent No.: US 11,124,003 B2
(45) Date of Patent: Sep. 21, 2021

(54) HANDHELD MOBILE PRINTING DEVICE

(71) Applicants: Masashi Ota, Kanagawa (JP); Munekazu Hirata, Tokyo (JP); Kunihiko Nishioka, Kanagawa (JP); Tomoya Fujii, Kanagawa (JP); Yohei Osanai, Kanagawa (JP); Satoshi Narai, Kanagawa (JP); Masatoshi Ishida, Kanagawa (JP); Takayuki Andoh, Kanagawa (JP)

(72) Inventors: Masashi Ota, Kanagawa (JP); Munekazu Hirata, Tokyo (JP); Kunihiko Nishioka, Kanagawa (JP); Tomoya Fujii, Kanagawa (JP); Yohei Osanai, Kanagawa (JP); Satoshi Narai, Kanagawa (JP); Masatoshi Ishida, Kanagawa (JP); Takayuki Andoh, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/745,388

(22) Filed: Jan. 17, 2020

(65) Prior Publication Data
US 2020/0230984 A1 Jul. 23, 2020

(30) Foreign Application Priority Data

Jan. 23, 2019 (JP) ............................. JP2019-009033

(51) Int. Cl.
*B41J 3/36* (2006.01)
*B41J 29/13* (2006.01)
(Continued)

(52) U.S. Cl.
CPC ............. *B41J 25/34* (2013.01); *B41J 2/1752* (2013.01); *B41J 3/36* (2013.01); *B41J 29/13* (2013.01);
(Continued)

(58) Field of Classification Search
CPC ... B41J 25/34; B41J 2/1752; B41J 3/36; B41J 2/471; B41J 29/023; B41J 29/38;
(Continued)

(56) References Cited

U.S. PATENT DOCUMENTS 5,319,524 A * 6/1994 Welch .................. H05K 7/1425
361/754
5,850,238 A * 12/1998 Karita .................. B41J 2/17536
347/29
(Continued)

FOREIGN PATENT DOCUMENTS

CN 2923321 Y 7/2007
CN 102862398 A 1/2013
(Continued)

OTHER PUBLICATIONS

U.S. Appl. No. 16/451,424, filed Jun. 25, 2019 Masashi Ohta, et al.
(Continued)

*Primary Examiner* — Yaovi M Ameh
(74) *Attorney, Agent, or Firm* — Xsensus LLP

(57) ABSTRACT

An article includes a body member and a detachable member detachably attached to the body member. One of the body member and the detachable member includes a cover portion having an engaging portion on an inner wall face of the cover portion. The other includes a covered portion that is covered with the cover portion and has an engaged portion on an outer wall face of the covered portion. The engaging portion and the engaged portion are configured to be disengaged by warping the cover portion so that the cover portion displaces to an outer wall face side of the cover portion. The one of the body member and the detachable member includes a finger-applying-position indicator at a position deviated from a portion corresponding to the cover portion, on an outer wall face of the one. The finger-applying-
(Continued)

position indicator indicates a position to be applied with fingers of a user.

20 Claims, 14 Drawing Sheets

(51) Int. Cl.
*B41J 25/34* (2006.01)
*B41J 2/175* (2006.01)
*G02B 26/12* (2006.01)
*B41J 29/02* (2006.01)
*B41J 2/01* (2006.01)

(52) U.S. Cl.
CPC .............. *G02B 26/123* (2013.01); *B41J 2/01* (2013.01); *B41J 29/023* (2013.01)

(58) Field of Classification Search
CPC .... B41J 2/17513; B41J 2/17553; B41J 29/13; B41J 29/02; B41J 2/01; B41J 3/445; G02B 26/123
See application file for complete search history.

(56) References Cited

U.S. PATENT DOCUMENTS

| | | | | |
|---|---|---|---|---|
| 2007/0076045 | A1* | 4/2007 | James | B41J 3/36 347/29 |
| 2009/0162082 | A1 | 6/2009 | Shiraki et al. | |
| 2012/0062685 | A1 | 3/2012 | Serizawa et al. | |
| 2012/0300007 | A1 | 11/2012 | Fujii et al. | |
| 2013/0188004 | A1 | 7/2013 | Arai et al. | |
| 2013/0194370 | A1 | 8/2013 | Sakaue et al. | |
| 2014/0369046 | A1 | 12/2014 | Andoh | |
| 2016/0352955 | A1 | 12/2016 | Ishida et al. | |
| 2018/0361761 | A1 | 12/2018 | Okeguchi et al. | |
| 2019/0283452 | A1 | 9/2019 | Nishii et al. | |
| 2019/0283453 | A1 | 9/2019 | Nishii et al. | |
| 2019/0283467 | A1 | 9/2019 | Nishii et al. | |

FOREIGN PATENT DOCUMENTS

| | | |
|---|---|---|
| CN | 103802480 A | 5/2014 |
| CN | 107009736 A | 8/2017 |
| CN | 107020823 A | 8/2017 |
| JP | 9-131926 | 5/1997 |
| JP | 2019-155888 | 9/2019 |

OTHER PUBLICATIONS

U.S. Appl. No. 16/459,904, filed Jul. 2, 2019 Munekazu Hirata, et al.
U.S. Appl. No. 16/436,154, filed Jun. 10, 2019 Tomoya Fujii, et al.
U.S. Appl. No. 16/521,896, filed Jul. 25, 2019 Yohhei Osanai, et al.
U.S. Appl. No. 16/558,421, filed Sep. 3, 2019 Munekazu Hirata, et al.
U.S. Appl. No. 16/538,280, filed Aug. 12, 2019 Kunihiko Nishioka, et al.
U.S. Appl. No. 16/544,277, filed Aug. 19, 2019 Masashi Ohta, et al.
U.S. Appl. No. 16/567,521, filed Sep. 11, 2019 Masatoshi Ishida, et al.
Office Action dated Dec. 31, 2020 in Chinese Patent Application No. 202010046976.8, 6 pages.
Office Action dated Jul. 20, 2021 in Chinese Patent Application No. 202010046976.8, 5 pages.

* cited by examiner

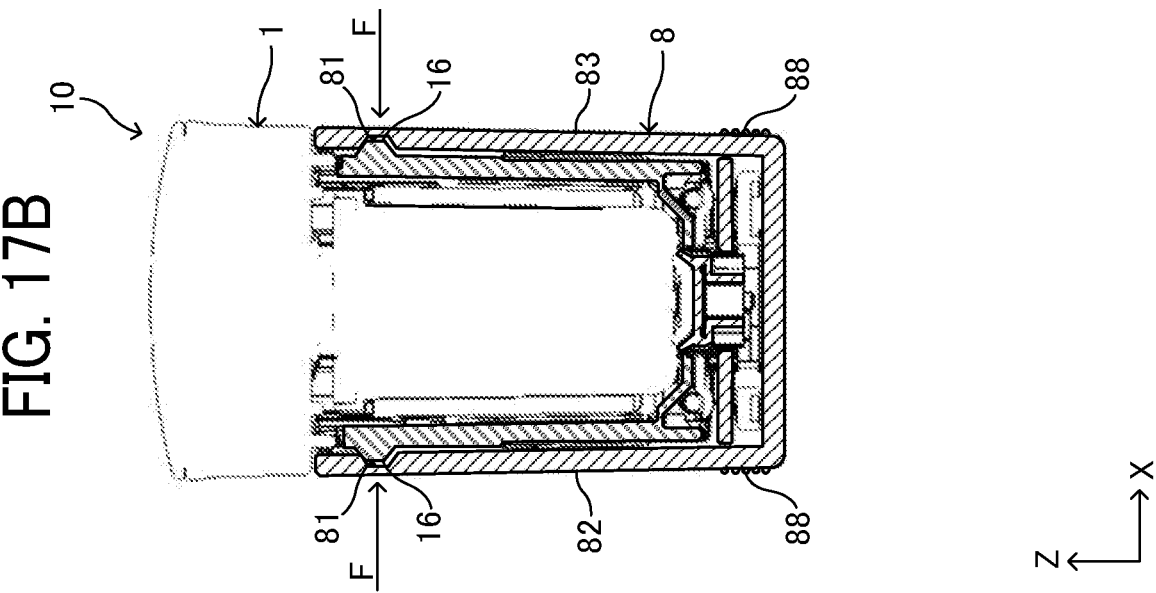
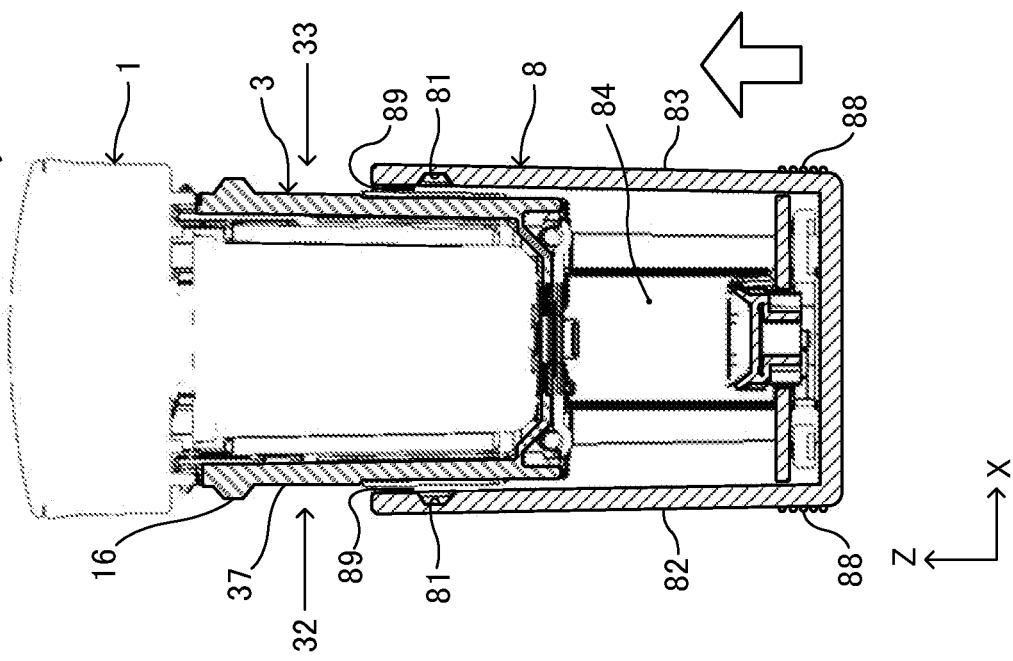

HANDHELD MOBILE PRINTING DEVICE

CROSS-REFERENCE TO RELATED APPLICATION

This patent application is based on and claims priority pursuant to 35 U.S.C. § 119(a) to Japanese Patent Application No. 2019-009033, filed on Jan. 23, 2019, in the Japan Patent Office, the entire disclosure of which is incorporated by reference herein.

BACKGROUND

Technical Field

The present disclosure relates to an article.

Description of the Background Art

Conventionally, there has been known an article that includes a body member and a detachable member detachably attached to the body member. One of the body member and the detachable member includes a cover portion having an engaging portion on an inner wall face of the cover portion. The other of the body member and the detachable member includes a covered portion that is covered with the cover portion and that has an engaged portion on an outer wall face of the covered portion. The detachable member is attached to the body member with the engaged portion being engaged with the engaging portion.

SUMMARY

In an aspect of the present disclosure, there is provided an article that includes a body member and a detachable member detachably attached to the body member. One of the body member and the detachable member includes a cover portion having an engaging portion on an inner wall face of the cover portion. The other of the body member and the detachable member includes a covered portion that is covered with the cover portion and that has an engaged portion on an outer wall face of the covered portion. The detachable member is attached to the body member with the engaged portion being engaged with the engaging portion. The engaging portion and the engaged portion are configured to be disengaged by warping the cover portion so that the cover portion displaces to an outer wall face side of the cover portion. The one of the body member and the detachable member includes a finger-applying-position indicator at a position deviated from a portion corresponding to the cover portion, on an outer wall face of the one of the body member and the detachable member. The finger-applying-position indicator indicates a position to be applied with fingers of a user.

BRIEF DESCRIPTION OF THE DRAWINGS

The aforementioned and other aspects, features, and advantages of the present disclosure would be better understood by reference to the following detailed description when considered in connection with the accompanying drawings, wherein:

FIG. 17A is a cross-sectional view taken along an X-Z plane illustrating a state in the middle of attachment movement for attaching the cover to the HMP body;

FIG. 17B is a cross-sectional view taken along the X-Z plane illustrating a state where the attachment of the cover to the HMP body is completed.

Figure 1:
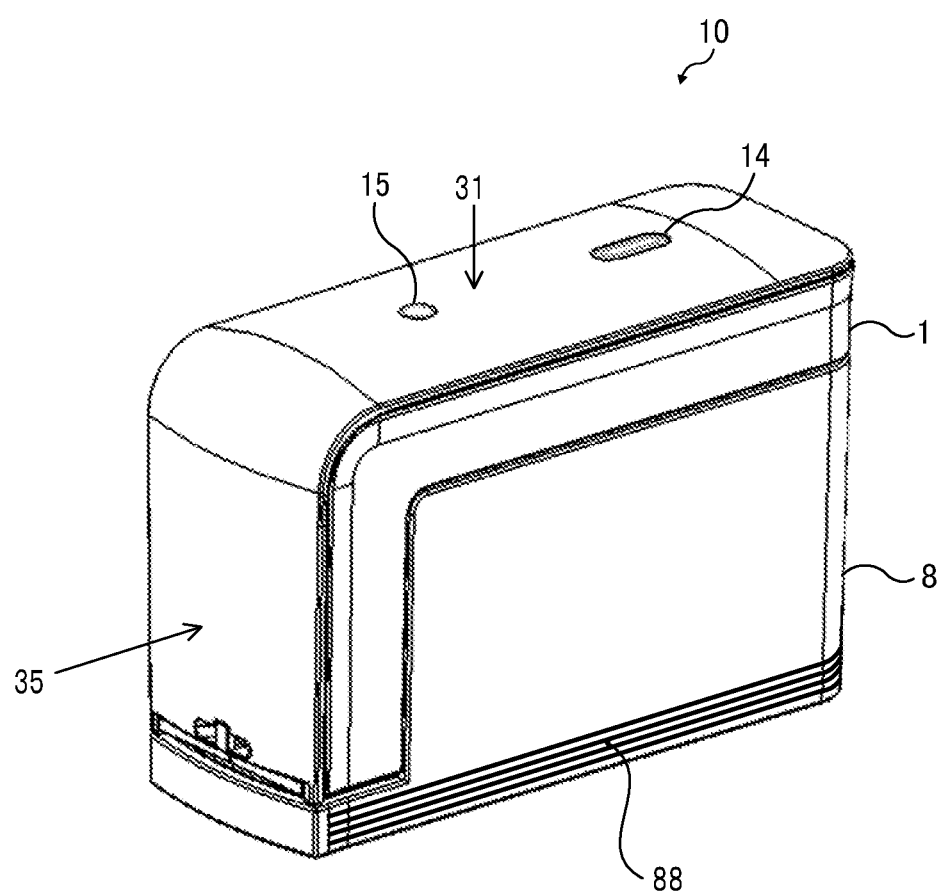
FIG. 1 is an external perspective view of a handy mobile multifunction printer (HMP) according to an embodiment as viewed obliquely from above.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity.

However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, a description is given of an embodiment in which the present disclosure is applied to a handy mobile inkjet printer (hereinafter referred to as HMP) serving as a portable image forming apparatus serving, as an article. First, a basic configuration of a body member of the HMP according to the present embodiment is described.

Figure 2:
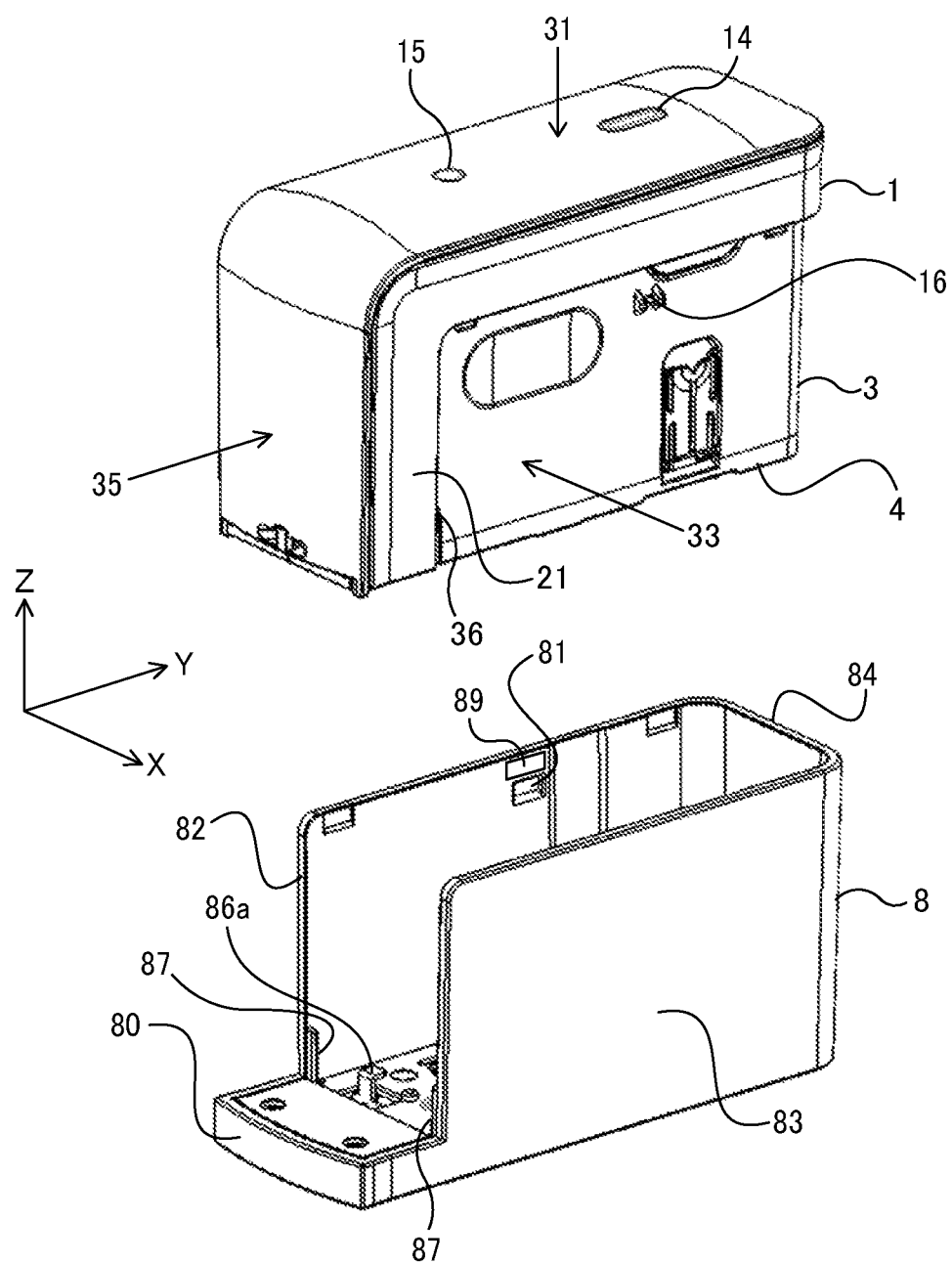
FIG. 2 is an external perspective view of the HMP in a state in which a cover is detached from an HMP body.

FIG. 1 is an external perspective view of an HMP 10 according to the present embodiment as viewed obliquely from above. FIG. 2 is an external perspective view illustrating a state of a cover 8 serving as a detachable member detached from an HMP body 1 as the body member of the HMP 10.

The HMP 10 according to the present embodiment includes the HMP body 1 as the body member, a spacer 4 detachably attachable to the HMP body 1, and the cover 8 serving as the detachable member. The cover 8 is to be installed to the HMP body 1 with the spacer 4 attached to the HMP body 1 accommodated. The cover 8 is made of a resin such as acrylonitric butadiene styrene (ABS) resin, and each recess 81 is formed on inner wall faces of the cover 8. When the cover 8 is installed to the HMP body 1, two projections 16 (one is not illustrated) serving as engaged portions provided on the HMP body 1 are respectively caught, by snap-fit, with the two recesses 81 (one is not illustrated) serving as engaging portions provided on the cover 8. As a result, the state of the cover 8 attached to the HMP body 1 is retained. When the cover 8 is removed from the HMP body 1, a user pulls out the HMP body 1 from the cover 8 to release the projections 16 caught by snap-fit from the recesses 81, so that the user can remove the cover 8 from the HMP body 1.

Figure 3:
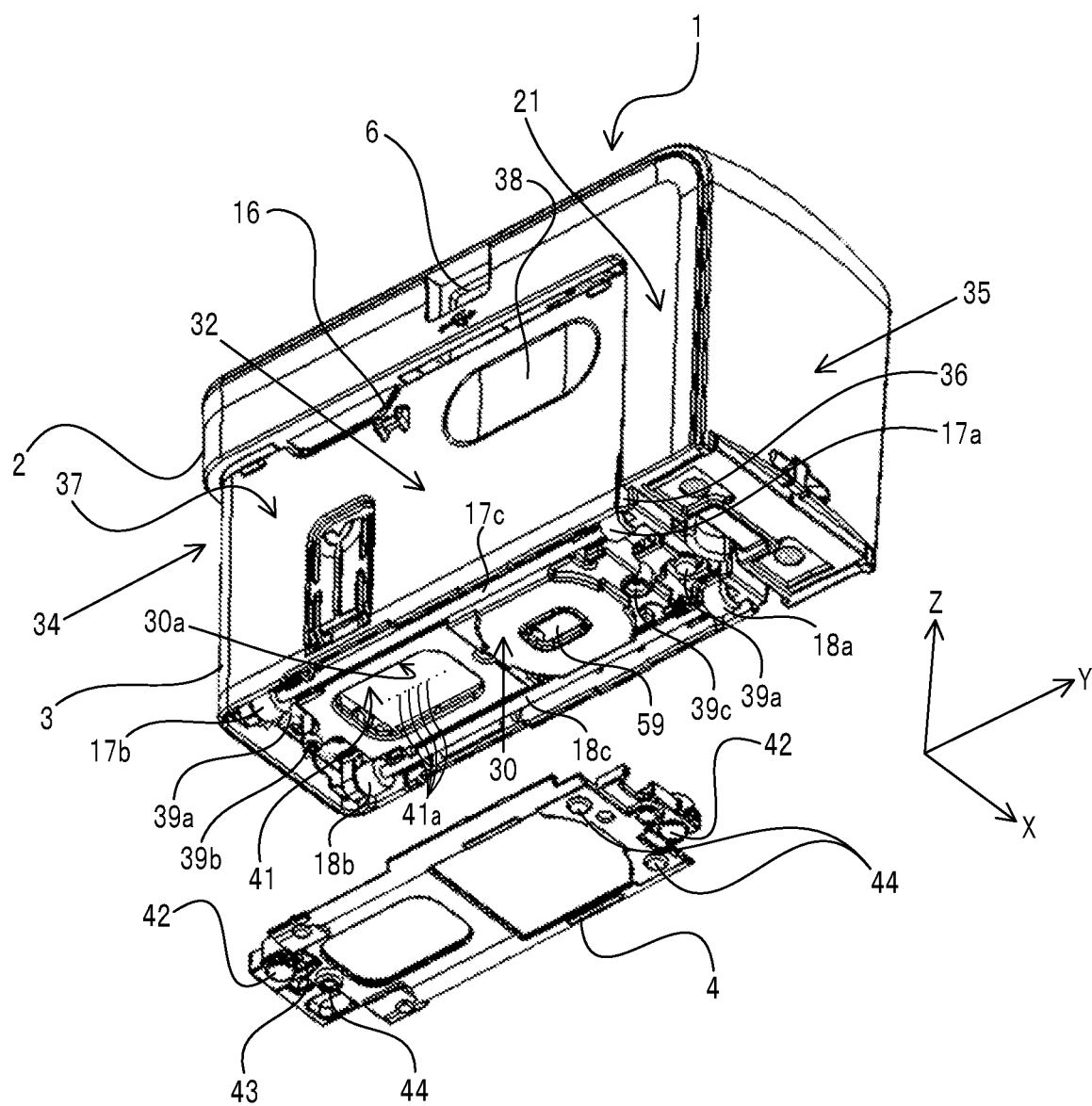
FIG. 3 is an external perspective view of the HMP body in a state in which a spacer is detached, as viewed obliquely from bottom.

FIG. 3 is an external perspective view of the HMP body 1 and the spacer 4 in a state of the spacer 4 detached from the HMP body 1, as viewed obliquely from below. The HMP body 1 illustrated in the figure mainly includes an upper unit 2 and a lower unit 3. The HMP body 1 has a substantially rectangular parallelepiped shape as a whole and a length in a scanning direction (=printing direction: arrow X direction in the figure) as enough to be grabbed by a hand of the user.

The housing of the HMP body 1 has, for example, a recording face 30, an upper face 31, and a left side face 32. The recording face 30 is an opposing face that causes a recorder 41 (image former) of an inkjet head described later to face a recording material such as a sheet. The upper face 31 is a face opposite to the recording face 30. The left side face 32 extends in a direction orthogonal to the scanning direction (arrow X direction in the figure) (arrow Y direction in the figure, hereinafter referred to as "scanning orthogonal direction") of the recording face 30. In addition, the housing of the HMP body 1 also has a right side face 33 extending in the scanning orthogonal direction, a back face 34 extending in the scanning direction (X direction), a front face 35 extending in the scanning direction, and the like. The HMP body 1 is normally used in an attitude in which the recording face 30 is directed vertically downward and the upper face 31 is directed vertically upward.

A print button 14 and a power button 15 are provided on the upper face 31. A universal serial bus (USB) connection port 6 is provided on the left side face 32 side of the upper unit 2. The USB connection port 6 is use for connecting a USB cable. Power is supplied from an external power source to a chargeable battery attached in the HMP body 1, via the USB cable connected to the USB connection port 6.

A wide part 21 of the upper unit 2 wider than a narrow part 37 of the lower unit 3 is located on the front face 35 side of the lower unit 3. Hold parts 38 are respectively formed at positions on the left and right side faces 32 and 33 of the narrow part 37 of the lower unit 3. The user applies fingers of the hand of the user to the positions (usually positions to which a thumb, and a middle finger or a ring finger are applied respectively) when the user holds the HMP body 1 to use the HMP 10. During using, that is, in order to form an image, when moving the HMP body 1 in the scanning direction (arrow X direction in the figure) on the surface of the recording material, the user holds the HMP body 1 such that the wide part 21 faces a wrist side of the user and the lower unit 3 is held between the fingers respectively applied to the hold parts 38 of the left and right side faces 32 and 33.

The wide part 21 is wider than the narrow part 37 in the scanning orthogonal direction such that an outer wall face of the wide part 21 and an outer wall face of the cover 8 are substantially flush with each other when the cover 8 is installed to the HMP body 1 as illustrated in FIG. 1.

Figure 4:
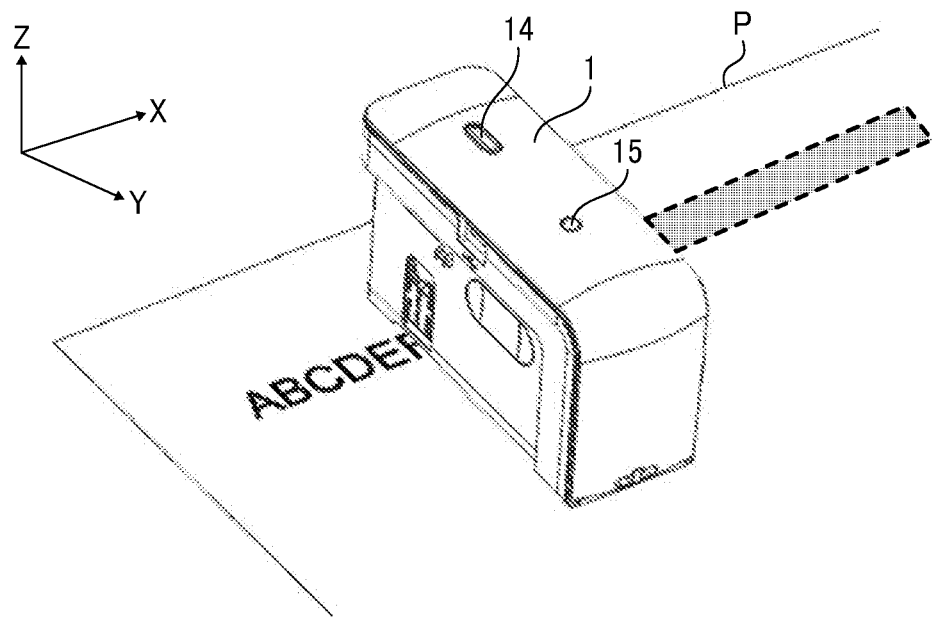
FIG. 4 is an explanatory view illustrating a situation where an image is formed on a recording material with the HMP body.

The user presses and holds the power button 15 to enable switching between ON and OFF of the power source of the HMP body 1. With the power source turned on, a control board provided in the upper unit 2 of the HMP body 1 can acquire image information through wireless communication with a smartphone or the like. After the turning on the power source, the user places the HMP body 1 on the surface of the recording material, in an attitude in which the recording face 30 faces the surface of the recording material. Then, the user presses the print button 14 to move the HMP body 1 along the scanning direction (X direction) as illustrated in FIG. 4, so that an image on the surface of a recording material P can be made. In a case where the HMP body 1 is reciprocated along the scanning direction by the user's moving operation (manually scanning), an image can be formed on the surface of the recording material in each of forward movement and backward movement.

The recording material P is not limited to paper such as a sheet. Examples of the recording material P include any image forming target such as an overhead projector (OHP), cloth, corrugated cardboard, a packaging container, glass, and a substrate.

Figure 5:
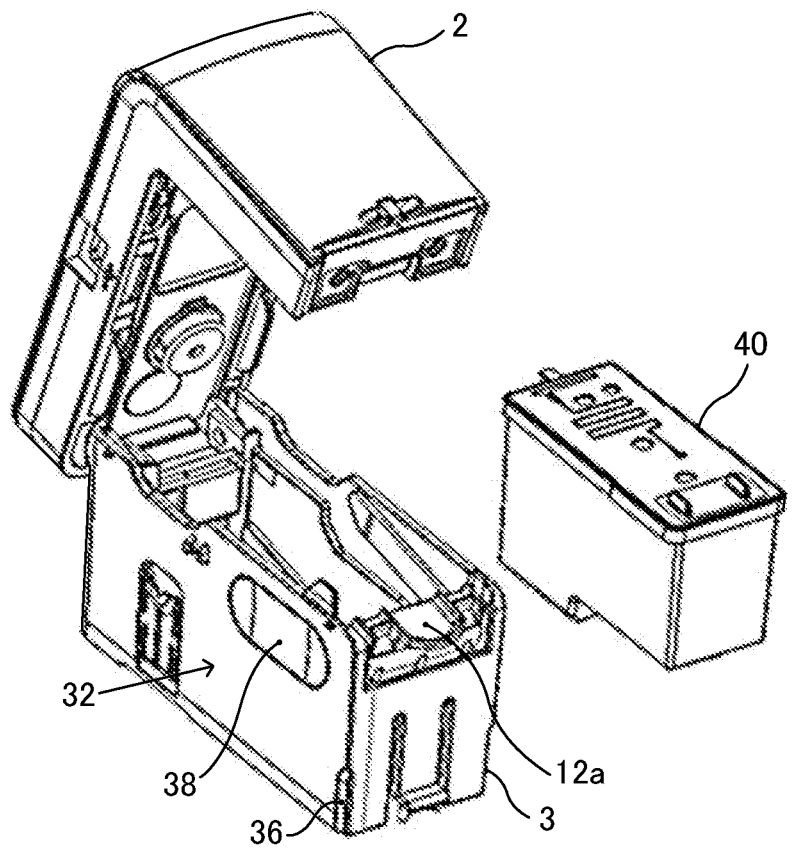
FIG. 5 is a perspective view illustrating a state where an inkjet head (ink cartridge) is detached from the HMP body.

FIG. 5 is a perspective view illustrating a state where an inkjet head 40 (ink cartridge) is removed from the HMP body 1. As illustrated in FIG. 5, the HMP body 1 of the present embodiment is supported by the lower unit 3 such that the upper unit 2 opens or closes with respect to the lower unit 3. Inside the lower unit 3, the ink-tank-integrated inkjet head 40 (ink cartridge) integrally including the recorder 41 and an ink tank is detachably attached. At this time, the recorder 41 that ejects ink droplets is directed vertically downward. The recorder 41 ejects the ink droplets to record an image, and the inkjet head 40 forms the image. When the user pulls, to the front face side, an attaching-and-detaching operation part 12*a* of a cartridge attaching-and-detaching mechanism, the inkjet head 40 lifts up and the inkjet head 40 can be removed.

As illustrated in FIG. 3, the recording face 30 of the HMP body 1 is provided with an opening 30*a* for externally exposing the recorder 41 of the inkjet head 40 attached in the lower unit 3. The recorder 41 of the inkjet head 40 has a plurality of ejection holes 41*a*, and are capable of individually eject the ink droplets from the respective ejection holes 41*a* by drive of a piezoelectric element.

As a driving source for ejecting the ink, the inkjet head 40 can include: an electromechanically transducing element (e.g., piezoelectric actuator) including a laminated piezoelectric element, a thin-film piezoelectric element, or the like; an electrothermally transducing element such as a heating resistor; or an electrostatic actuator including a vibration plate and a counter electrode.

The ink (liquid) to be ejected from the ejection holes 41*a* of the recorder 41 is not particularly limited as long as the ink is a liquid having a viscosity or a surface tension with which the ink can be ejected from the ejection holes 41*a*, and may be an ink having a viscosity of 30 mPa·s or less at ordinary temperatures and pressures, or by heating or cooling. Specifically, examples of the ink (liquid) include a solution, a suspension, and an emulsion, containing: a solvent such as water or an organic solvent; a colorant such as a dye or a pigment; a function proving material such as a polymerizable compound, a resin, or a surfactant; biocompatible material such DNA, an amino acid, a protein, or calcium; or an edible material such as a natural pigment. These solution, suspension, and emulsion can be used as, for example, an inkjet ink, a surface treatment liquid, a constituent element of an electronic device and a light-emitting device, a liquid for forming an electronic-circuit resist pattern, and a material liquid for three-dimensional modeling.

The recording face 30 is provided with a position sensor 59 serving as a detection device that detects the position of the HMP body 1 on the recording material, and a left-side first roller 17*a*, a left-side second roller 17*b*, a right-side first roller 18*a*, and a right-side second roller 18*b* that are each rotatable.

When the HMP body 1 is operated to move in the scanning direction by the user, the HMP body 1 causes the above-described four rollers that are in contact with the surface of the recording material to roll. Providing such rollers allows the user to move straight the HMP body 1 along the scanning direction and reciprocate the HMP body 1 in the scanning direction. At this time, only the four rollers that are provided at the HMP body 1 are in contact with the surface of the recording material or the surface of the table on which the recording material is placed. The four rollers make space between the recording face 30 and the surface of the recording material by a predetermined distance. With this arrangement, the distance between the recorder 41 of the inkjet head 40 and the surface of the recording material is kept constant, and a desired high-quality image can be formed.

The position sensor 59 detects a distance to the surface of the recording material and the surface condition (e.g., unevenness) of the recording material, or detects a movement distance of the HMP body 1. As the position sensor 59, a sensor similar to a sensor included in an optical mouse (pointing device) of a personal computer can be used, for example. The position sensor 59 irradiates, with light, a location (recording material) where the HMP body 1 is placed, and reads the state of the portion as a "pattern".

Then, the position sensor 59 successively captured how the "pattern" moves with respect to the movement of the position sensor 59 to calculate the movement amount.

Figure 6:
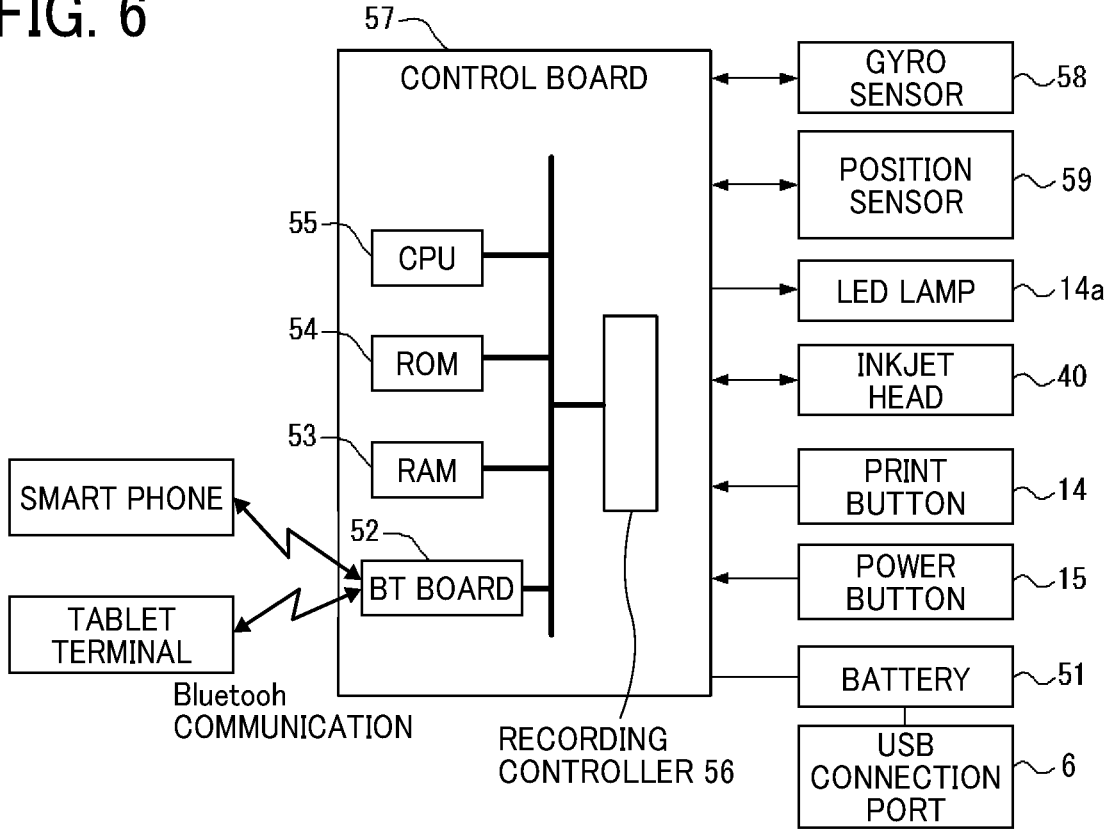
FIG. 6 is a block diagram illustrating part of an electric circuit of the HMP body.

FIG. 6 is a block diagram illustrating part of an electric circuit of the HMP body 1. The control board 57 includes a central processing unit (CPU) 55 that executes various types of arithmetic processing and a program, a Bluetooth (registered trademark) (Bt) board 52 for short-range wireless communication, a random access memory (RAM) 53 that temporarily stores data, a read only memory (ROM) 54, a recording controller 56, and the like. The control board 57 is secured at a position on the back side of the USB connection port 6 in the hollow of the upper unit 2.

The Bt board 52 performs data communication through short-range wireless communication (Bluetooth communication) with an external device such as a smartphone or a tablet terminal. The ROM 54 stores firmware that controls the hardware of the HMP body 1, drive waveform data of the inkjet head 40, and the like. The recording controller 56 executes data processing for driving the inkjet head 40 and generates a drive waveform.

A gyro sensor 58, the position sensor 59, a light-emitting diode (LED) lamp 14*a*, the inkjet head 40, the print button 14, the power button 15, a battery 51, and the like are electrically connected to the control board 57.

The gyro sensor 58 detects the tilt and rotation angle of the HMP body 1 with a known technique and transmits the result to the control board 57. The LED lamp 14*a* is provided inside an exterior cover of the print button 14, the exterior cover including an optically-transparent material. The LED lamp 14*a* illuminates the print button 14 with light.

When the power button 15 is pressed to turn on the power source of the HMP body 1, power is supplied to each module. Then, the CPU 55 starts a startup operation on the basis of the program stored in the ROM 54 and develops the program and respective pieces of data in the RAM 53. After receiving image data from the external device through the short-range wireless communication, the recording controller 56 generates a drive waveform according to the received image data. Then, the recording controller 56 controls ejection of ink from the inkjet head 40 such that an image according to a position on the surface of the recording material detected by the position sensor 59 is formed.

During acquisition of the image data by the recording controller 56 through the short-distance wireless communication with the external device, the control board 57 causes the LED lamp 14*a* to flash, so that the optically-transparent print button 14 is illuminated and flashes with light. After the illuminating and flashing of the print button 14 with light, when the acquisition of the image data is completed, the control board 57 causes the LED lamp 14*a* to light up continuously and the print button 14 is illuminated continuously with light. The user who sees the continuous illumination knows that the HMP body 1 has finished the image data acquisition, and then places the HMP body 1 on the recording material to press the print button 14.

Whereas, after starting the continuous illumination control of the LED lamp 14*a*, the control board 57 waits for the print button 14 to be pressed. When the print button 14 is pressed, the control board 57 causes the LED lamp 14*a* to flash, so that the print button 14 is illuminated and flashes with light. The user who sees the illuminating and flashing of the print button 14 with light starts moving operation (manually scanning) of the HMP body 1 in the scanning direction.

The user who has finished the moving operation (manually scanning) of the HMP body 1 presses the print button 14 again. After the button 14 is pressed again, the control board 57 turns off the LED lamp 14a and stops the illumination of the print button 14 with light. In some cases, the user picks up the HMP body 1 from the recording material without pressing the print button 14 and places the HMP body 1 directly on the table or the like, or installs the HMP body 1 to the cover 8 and places the HMP body 1. In this case, when the user picks up the HMP body 1 from the recording material, the position sensor 59 is no longer able to detect the position on the surface of the recording material. Thus, at the timing when the position sensor 59 stops detecting the position, the control board 57 turns off the LED lamp 14a to stop the illumination of the print button 14 with light.

Continuously pressing of the print button 14 during the moving operation (manually scanning) is not required. If the user presses and releases the print button 14 prior to the moving operation, image formation processing based on the detection result by the position sensor 59 is continuously performed until the end of the image formation, the print button 14 is pressed again, or the position sensor 59 is undetectable the position.

The HMP body 1 of the present embodiment has the rollers 17a, 17b, 18a, and 18b of roller units 17 and 18 respectively disposed at positions deviated from the position of the recorder 41, in the scanning orthogonal direction (Y direction). With such disposition positions, the rollers 17a, 17b, 18a, and 18b do not come into contact with an image portion immediately after the image formation, during the moving operation of the HMP body 1. Thus, the image can be avoided from distortion due to contact of the rollers 17a, 17b, 18a, and 18b.

Figure 7:
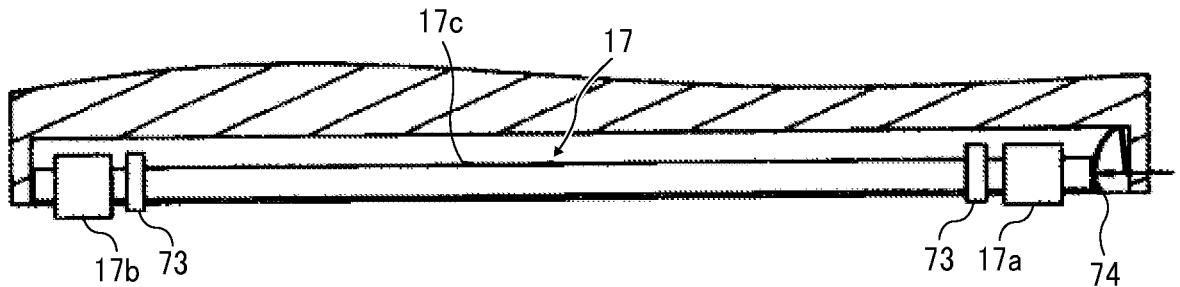
FIG. 7 is a partial cross-sectional view illustrating a lower unit of the HMP body with a left-side roller unit installed.

FIG. 7 is a partial cross-sectional view illustrating the lower unit 3 of the HMP body 1 with the left-side roller unit 17 installed. A pressurizing plate spring 74 is secured to the wall of the lower unit 3. The pressurizing plate spring 74 axially pressurizes one end in the longitudinal direction of a shaft 17c of the left-side roller unit 17 toward the other end, so that the other end in the longitudinal direction of the shaft is pressed against the inner wall of a casing of the lower unit 3.

As describe above, the pressurizing plate spring 74 axially pressurizes the shaft 17c of the left-side roller unit 17 to reduce backlash in the axial direction of the left-side first roller 17a and the left-side second roller 17b (eliminate space that allows the backlash). As a result, image distortion due to the backlash can be reduced.

There has been described the example in which the pressurizing plate spring 74 axially pressurizes the shaft 17c of the left-side roller unit 17. Similarly, another pressurizing plate spring axially pressurizes a shaft 18c of the right-side roller unit 18. Instead of securing the pressurizing plate springs to the casing, the pressurizing plate springs may be secured to the ends of the shaft 17c and 18c of the roller units 17 and 18, respectively. Such a manner eliminates a process of assembling the pressurizing plate springs to the casing to enable reduction in assembling cost.

Here, the configuration including the rollers 17a, 17b, 18a, and 18b like the configuration of the HMP body 1 of the present embodiment can ensure straight traveling performance when the user operates to move (manually scans) the HMP body 1 in the scanning direction. However, when the HMP body 1 is operated to move along curved trajectories, the rollers 17a, 17b, 18a, and 18b hinder the moving operation along the curved trajectories and hamper favorable manual operation.

In addition, when a second line is recorded subsequently after recording of a first line, in order to avoid the position sensor 59 from being undetectable the position, there is required line feed operation in which the HMP body 1 is moved in the scanning orthogonal direction while the HMP body 1 is keeping an attitude in which the recording face 30 faces the surface of the recording material. As well as the moving operation of the HMP body 1 along the curved trajectories described above, in the line feed operation, the rollers 17a, 17b, 18a, and 18b of the HMP body 1 hinder movement of the HMP body 1 in the scanning orthogonal direction and hamper favorable line feed operation.

Therefore, the HMP 10 of the present embodiment is provided with the spacer 4 that is detachably attachable to the recording face 30 of the HMP body 1. Attaching or detaching the spacer 4 allows the usage mode of the HMP 10 to switch between a roller contact mode (see FIG. 8) and a roller non-contact mode (see FIG. 9). In the roller contact mode, the HMP body 1 scans while the rollers 17a, 17b, 18a, and 18b are in contact with the surface of the table on which the recording material P is placed or the surface of the recording material P and rolling. In the roller non-contact mode, the rollers 17a, 17b, 18a, and 18b are in non-contact with the surface of the table on which the recording material P is placed or the surface of the recording material P.

Figure 8:
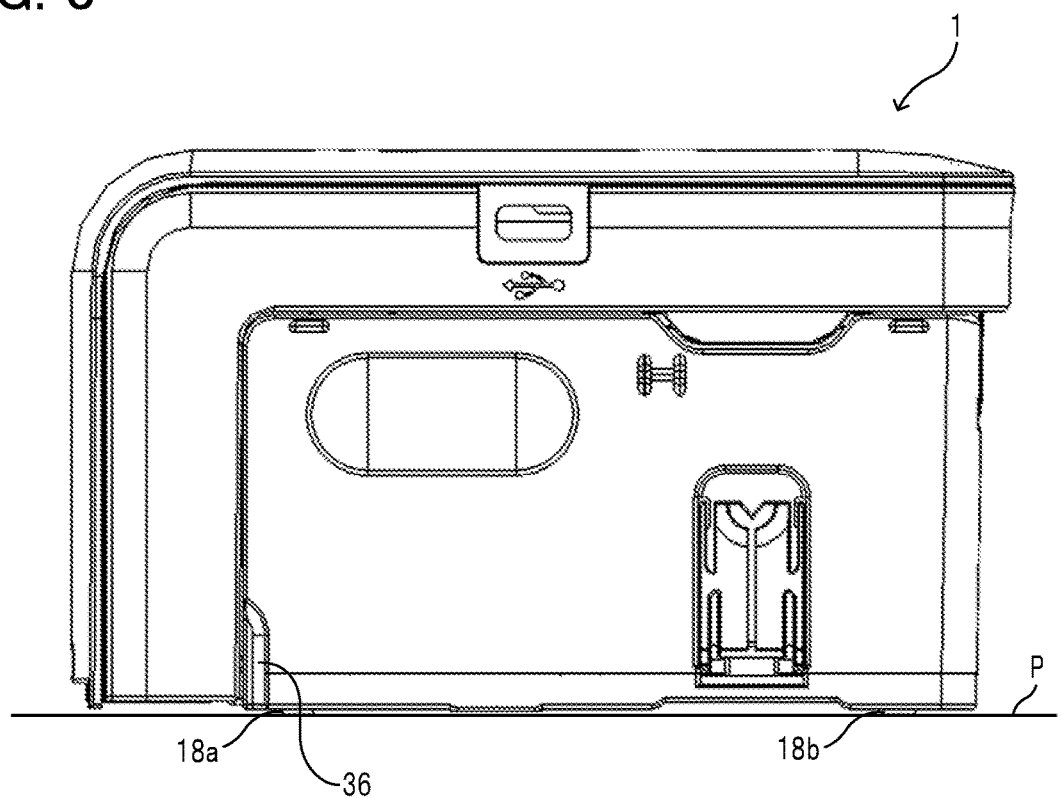
FIG. 8 is a right side view of the HMP body in a roller contact mode in which the spacer is not attached to the HMP body and scanning is performed while rollers are brought into contact with the surface of a table on which a recording material is placed or the surface of the recording material.
Figure 9:
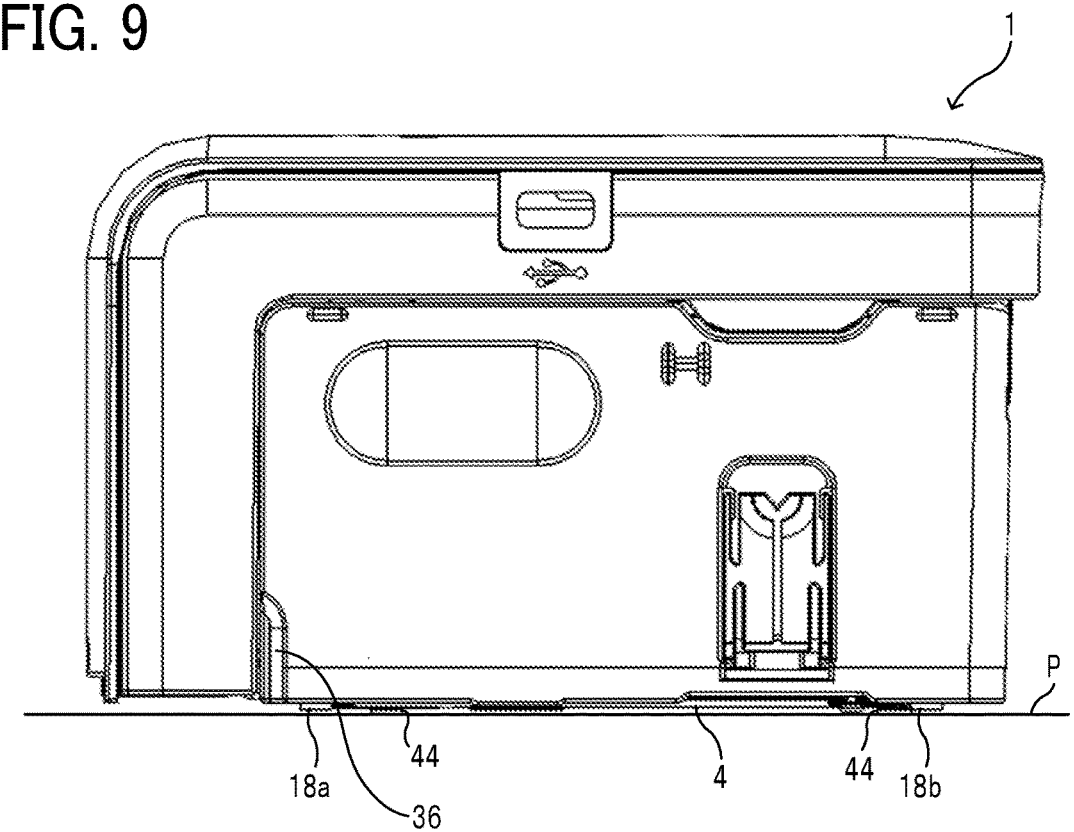
FIG. 9 is a right side view of the HMP body in a roller non-contact mode in which the spacer is attached to the HMP body and the rollers are not brought into contact with the surface of the table on which the recording material is placed or the surface of the recording material.
Figure 10:
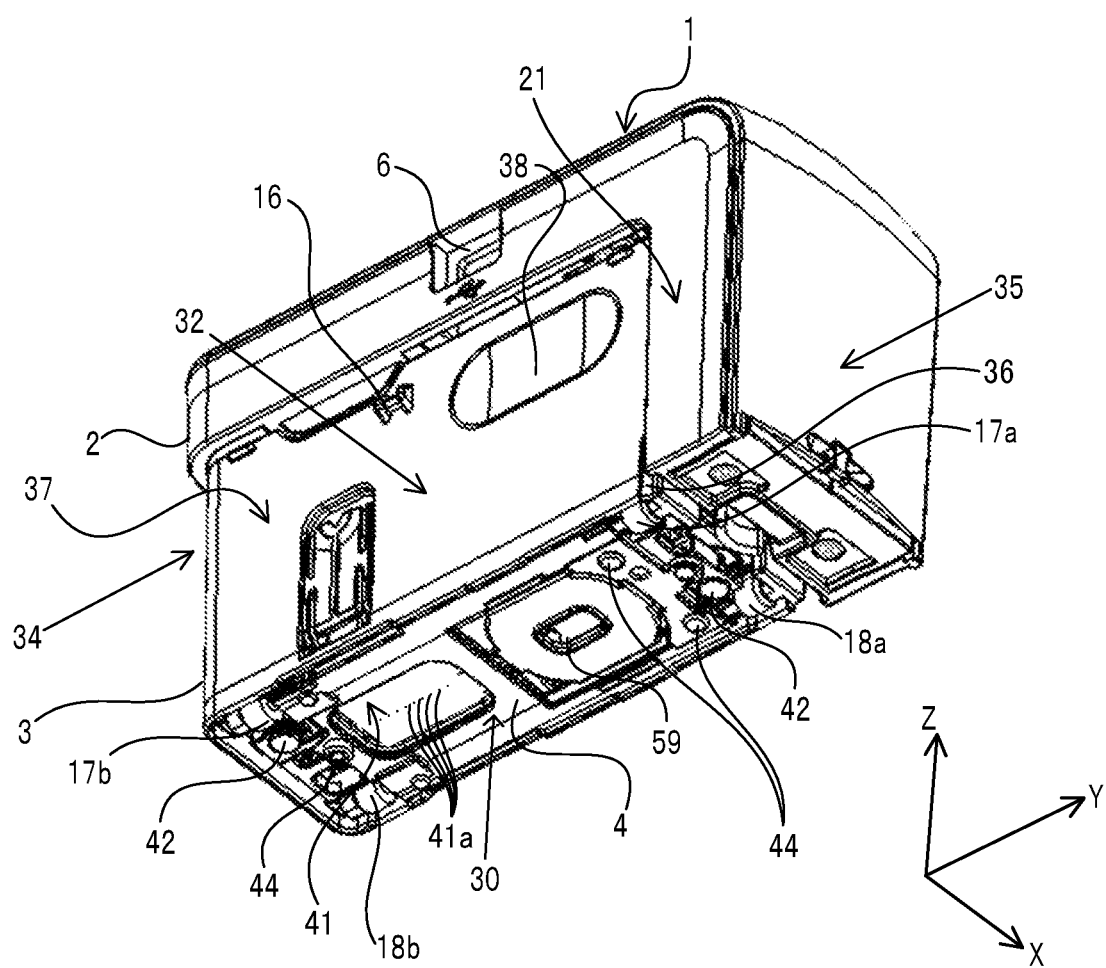
FIG. 10 is an external perspective view of the HMP body to which the spacer attached, as viewed obliquely from below.

FIG. 10 is an external perspective view of the HMP body 1 to which the spacer 4 is attached, as viewed obliquely from below. In a case where the spacer 4 is detached from the HMP body 1, the HMP 10 can be used in the roller contact mode as illustrated in FIG. 8. In the roller contact mode, the HMP 10 scans while the rollers 17a, 17b, 18a, and 18b of the HMP body 1 are in contact with the surface of the recording material P or the like and rolling. Thus, the straight traveling performance with the rollers 17a, 17b, 18a, and 18b allows the user to easily perform moving operation of the HMP body 1 straight along the scanning direction and form a proper image. In contrast, when the spacer 4 is attached to the recording face 30 of the HMP body 1, the HMP 10 can be used in the roller non-contact mode as illustrated in FIG. 9. In the -roller non-contact mode, the HMP 10 scans while the rollers 17a, 17b, 18a, and 18b of the HMP body 1 are in non-contact with the surface of the recording material P or the like.

The spacer 4 is attached to or detached from the recording face 30 of the lower unit 3 with each magnet. Specifically, the spacer 4 is provided with magnets 42. The magnets 42 are provided such that when the spacer 4 is attached to the recording face 30 of the HMP body 1, the magnets 42 are at positions respectively opposed to screw heads 39a of two metal screws that are magnetic bodies and exposed on the recording face 30. In the present embodiment, each magnetic body provided on the spacer 4 is described as an example of a fastening member such as a metal screw. The magnetic body, however, may be a frame member such as a metal frame of the spacer 4. Such a frame member is typically made of metal in order to ensure the rigidity, and can be used as a magnetic body.

In addition, as illustrated in FIG. 3, for the alignment between the recording face 30 of the lower unit 3 and the spacer 4, an alignment projection 39b and an alignment hole 39c are formed on the recording face 30. At the corresponding positions of the spacer 4, an alignment hole 43 into which the alignment projection 39b enter and an alignment projection into which the alignment hole 39c enter are formed. When the spacer 4 is properly aligned with the recording face 30 such that these alignment projections and alignment holes respectively fit into the counterpart alignment holes and alignment protrusions, the magnets 42 on the spacer 4 are respectively opposed to the screw heads 39a of the recording face 30. Then, as illustrated in FIG. 10, the spacer 4 is attached to the recording face 30 and retained on the recording face 30 by the magnetic force of the magnets 42.

The spacer 4 has a body made of a resin such as ABS resin. Three projections 44 for three-point supporting the HMP body 1 are provided on the recording-material opposing face of the spacer 4 (face opposite to the side facing the recording face 30 to which the spacer 4 is attached). As illustrated in FIG. 9, each leading end of the projections 44 of the spacer 4 attached to the recording face 30 of the HMP body 1 is at a distant position in a direction opposed to the recording material P with respect to the recording face 30 more distant than the rollers 17a, 17b, 18a, and 18b. Thus, when the HMP body 1 to which the spacer 4 is attached is placed on the recording material P, the respective leading ends of the projections 44 come in to contact with the surface of the recording face 30, and the rollers 17a, 17b, 18a, and 18b are lifted from the surface of the recording material P. As a result, the HMP 10 is in the roller non-contact mode.

When using the HMP 10 in the roller non-contact mode, the user holds the HMP body 1 and places the HMP body 1 such that the recording face 30 to which the spacer 4 is attached faces the surface of the recording material P. At this time, the HMP body 1 is three point supported above the recording material P by the three projections 44 of the spacer 4 with the rollers 17a, 17b, 18a, and 18b lifted from the surface of the recording material P. The user slides the three projections 44 on the surface of the recording material P to perform moving operation (manually scanning) of the HMP body 1. As a result, the user can form an image on the recording material P.

Figure 11:
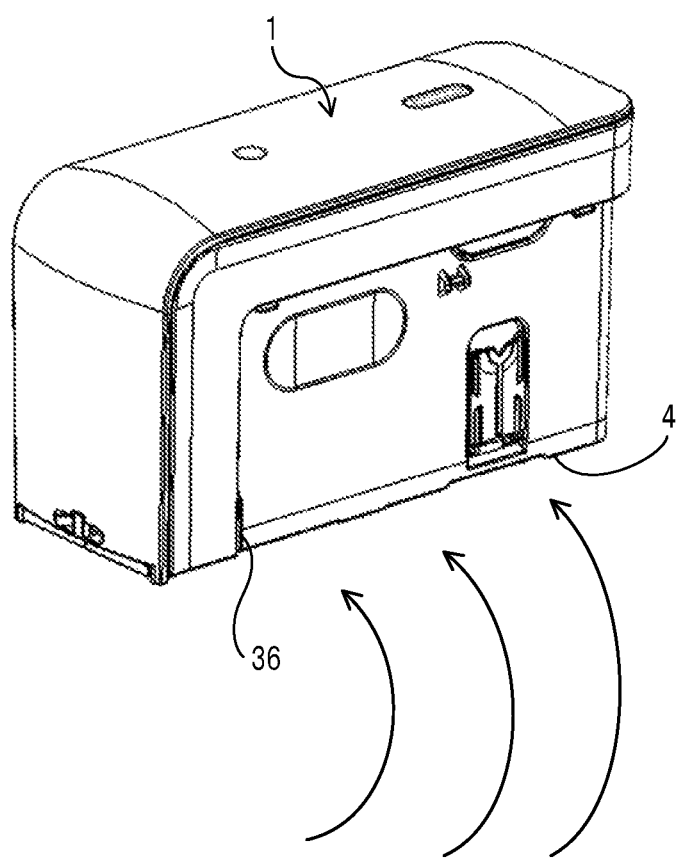
FIG. 11 is an explanatory view illustrating a situation where the HMP body in the roller non-contact mode is operated to move along curved trajectories.

FIG. 11 is a perspective view illustrating a situation where the HMP body 1 in the roller non-contact mode is operated to move along the curved trajectories. In the roller non-contact mode, the rollers 17a, 17b, 18a, and 18b are lifted from the surface of the recording material P. Thus, moving operation (manual operation) of the HMP body 1 in a direction different from the scanning direction (X direction) are not hampered by the rollers 17a, 17b, 18a, and 18b. Therefore, the curved traveling performance of the HMP body 1 is improved as compared with the roller contact mode. As a result, the moving operation of the HMP body 1 along the curved trajectories can be performed easily.

In addition, when a second line is recorded along the scanning direction at a different potion in the scanning orthogonal direction subsequently after recording of a first line along the scanning direction, even in the case of performing line feed operation in which the HMP body 1 is moved in the scanning orthogonal direction while the HMP body 1 is keeping an attitude in which the recording face 30 faces the surface of the recording material, the rollers 17a, 17b, 18a, and 18b do not hamper the line feed operation. As a result, the operability during the line feed operation is improved as compared with the roller contact mode. Note that, in the roller non-contact mode, the straight traveling performance with the rollers 17a, 17b, 18a, and 18b cannot be obtained. Thus, the user is required to move straight the HMP body 1 in the scanning direction without assistance of the rollers 17a, 17b, 18a, and 18b.

All of the three projections 44 provided on the spacer 4 of the present embodiment are disposed at positions deviated from the position of the recorder 41 (positions of the plurality of ejection holes 41a) of the inkjet head 40 in the scanning orthogonal direction (Y direction). This disposition enables preventing, in image formation in the roller non-contact mode, an image from distortion due to scratching of an image portion by the projections 44 immediately after the image formation.

Next, the cover 8 included in the HMP 10 according to the present embodiment will be described. The cover 8 of the present embodiment is attachable to the HMP body 1 with the spacer 4 attached to the HMP body 1 accommodated. As illustrated in FIG. 2, the cover 8 of the present embodiment includes a bottom face part 80 on which the HMP body 1 is to be placed, and three wall face parts 82, 83, and 84 extending from a top face of the bottom face part 80 in a Z direction in the figure. The three wall face parts 82, 83, and 84 respectively face the left side face 32, the right side face 33, and the back face 34 of the narrow part 37 in the lower unit 3 of the HMP body 1, with the HMP body 1 placed on the bottom face part 80.

In the present embodiment, as an example of the case where the cover 8 is installed to the HMP body 1, such as illustrated in FIG. 2, the HMP body 1 is inserted from above (Z direction) in the figure into the cover 8 placed on the table such that the narrow part 37 of the lower unit 3 of the HMP body 1 fits in space surrounded by the three wall face parts 82, 83, and 84. As a result, the two projections 16 provided on the HMP body 1 are respectively caught by the two recesses 81 on respective inner walls of left and right wall face parts 82 and 83 of the cover 8 by snap-fit. As a result, the state of the cover 8 installed to the HMP body 1 is retained.

Figure 12:
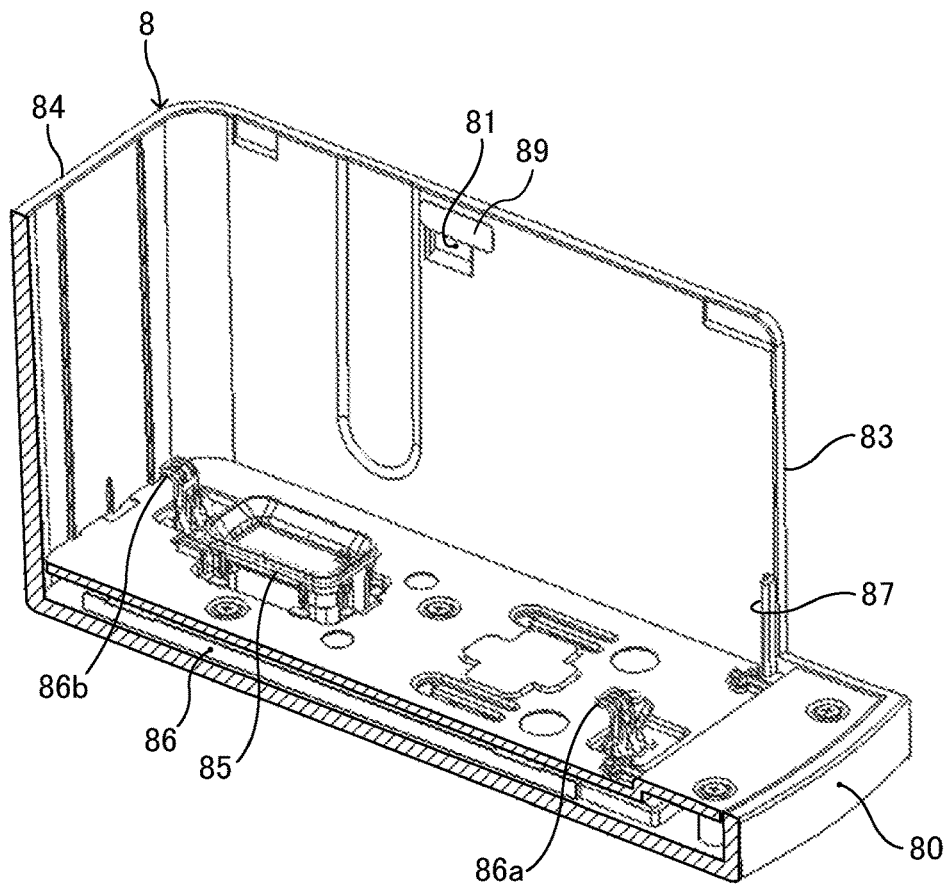
FIG. 12 is a perspective view of the inside of the cover viewed with a left wall face part removed.

FIG. 12 is a perspective view of the inside of the cover 8 viewed with the left wall face part 82 removed. The cover 8 of the present embodiment includes a cap 85 serves as an image former protector that protects the recorder 41 (the plurality of ejection holes 41a) of the inkjet head 40. With the cover 8 attached to the HMP body 1, the cap 85 is attached so as to be in close contact with the recorder 41 of the inkjet head 40 exposed on the recording face 30 of the HMP body 1 and covers the plurality of ejection holes 41a on the recorder 41. As a result, with the cover 8 attached to the HMP body 1, the ejection holes 41a of the HMP body 1 are sealed in the cap 85 to be protected and moisturized.

In the present embodiment, there is provided an attachment-and-detachment switch that switches a retaining state of the spacer 4 such that an attachment state is made in which the spacer 4 is attachable to the HMP body 1 and a detachment state is made in which the spacer 4 is detachable from the HMP body 1, when the cover 8 is removed from the HMP body 1. The attachment-and-detachment switch of the present embodiment is provided on the cover 8, and switches between a cover-side retaining state where the cover 8 retains the spacer 4 and an HMP-body-side retaining state where the spacer 4 can be retained by the HMP body 1 (non-retaining state where the cover 8 does not retain the spacer 4).

Figure 13:
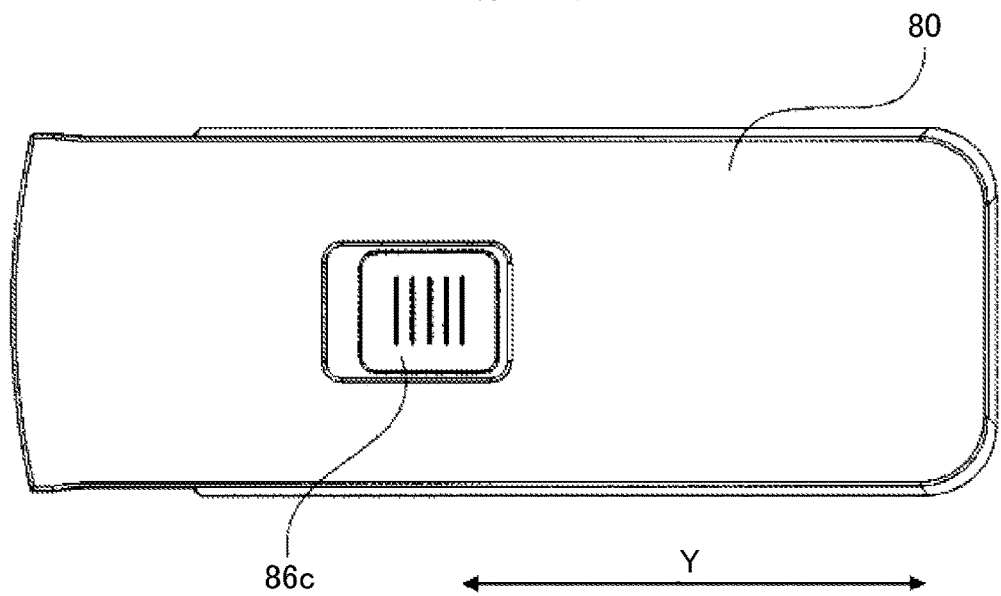
FIG. 13 is a bottom view of the cover.

In the present embodiment, a slide lock 86 is slidably movable along the scanning orthogonal direction (Y direction) with respect to the bottom face part 80. Specifically, as illustrated in FIG. 13, a slide operation part 86c secured to the slide lock 86 is exposed on a lower face of the bottom face part 80 of the cover 8. The user performs slide operation of the slide operation part 86c along the Y direction in the figure, so that the slide lock 86 slides and moves in conjunction with the slide operation.

Figure 14A:
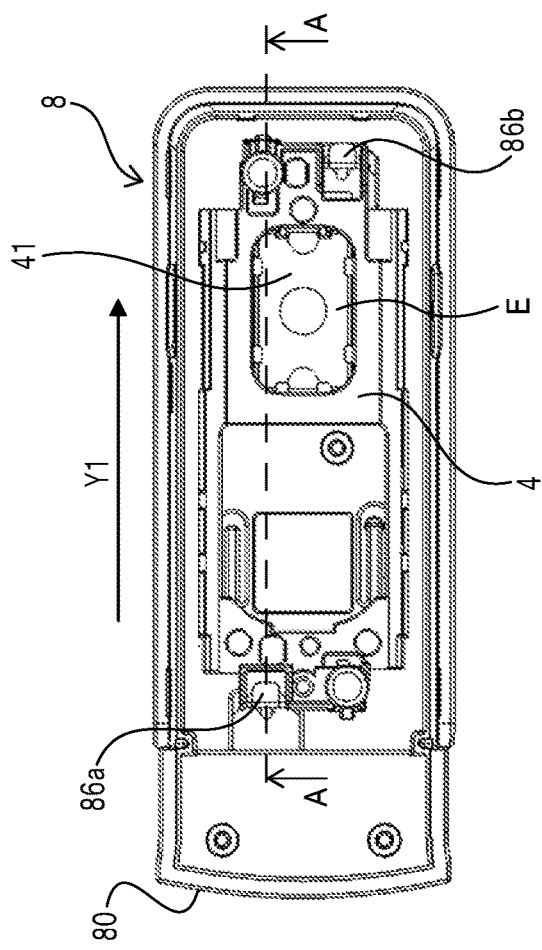
FIG. 14A is a top view illustrating only the spacer is placed on a bottom face part of the cover with the HMP body not installed, in a retaining state.
Figure 14B:
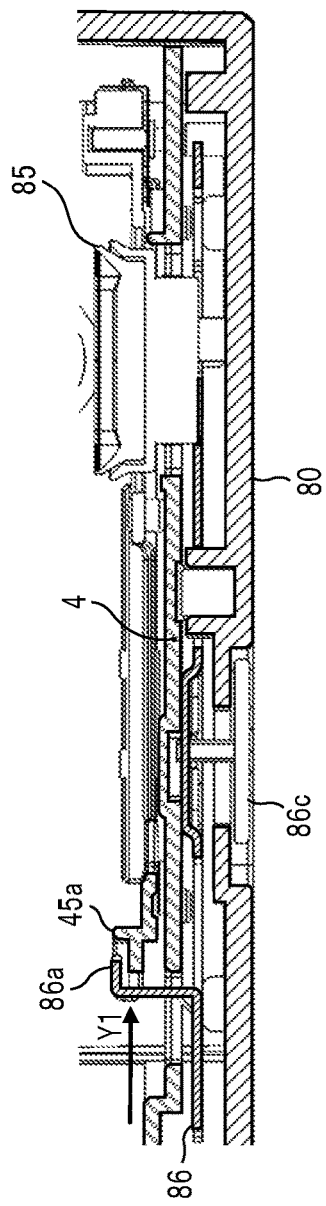
FIG. 14B is a cross-sectional view illustrating cross section A-A in FIG. 14A.

FIG. 14A is a top view illustrating only the spacer 4 is placed on the bottom face part 80 of the cover 8 with the HMP body 1 not installed. FIG. 14B is a cross-sectional view illustrating cross section A-A in FIG. 14A. FIGS. 14A and 14B each illustrate the cover-side retaining state where the cover 8 retains the spacer 4. When the user performs slide operation of the slide operation part 86c in a Y1 direction in the figures, the slide lock 86 slides and moves in the Y1 direction in conjunction with the slide operation. The slide lock 86 is provided with the lock parts 86a and 86b that respectively engage with locked parts 45a and 45b provided on the spacer 4.

After the slide lock 86 slides in the Y1 direction in the figures, as illustrated in FIG. 14B, an end of the lock part 86a on the slide lock 86 is positioned above the locked part 45a of the spacer 4. Similarly, an end of the other lock part 86b is positioned above locked part 45b. With the positioning of the ends, when the user pulls out the HMP body 1 in the Z direction from the cover 8 in order to remove the cover 8 from the HMP body 1, the spacer 4 attached to the HMP body 1 by magnetic force enters a locked state (engaged state). In the locked state, the locked parts 45a and 45b of the spacer 4 are caught respectively by the ends of the lock parts 86a and 86b of the slide lock 86 of the cover 8, and follow-up of the spacer 4 to the HMP body 1 to be pulled out is prevented.

As a result, after the pulling out of the HMP body 1 from the cover 8, the spacer 4 is retained on the cover 8 side. Thus, when the HMP 10 is in the usable mode in which the rollers are used (roller contact mode), the user performs the slide operation in the Y1 direction to pull out the HMP body 1 as illustrated in FIGS. 14A and 14B. After pulling out the HMP body 1, the user can obtain the HMP body 1 with the spacer 4 detached from the HMP body 1, and can perform image forming operation using the HMP body 1 from which the spacer 4 is detached.

Figure 15A:
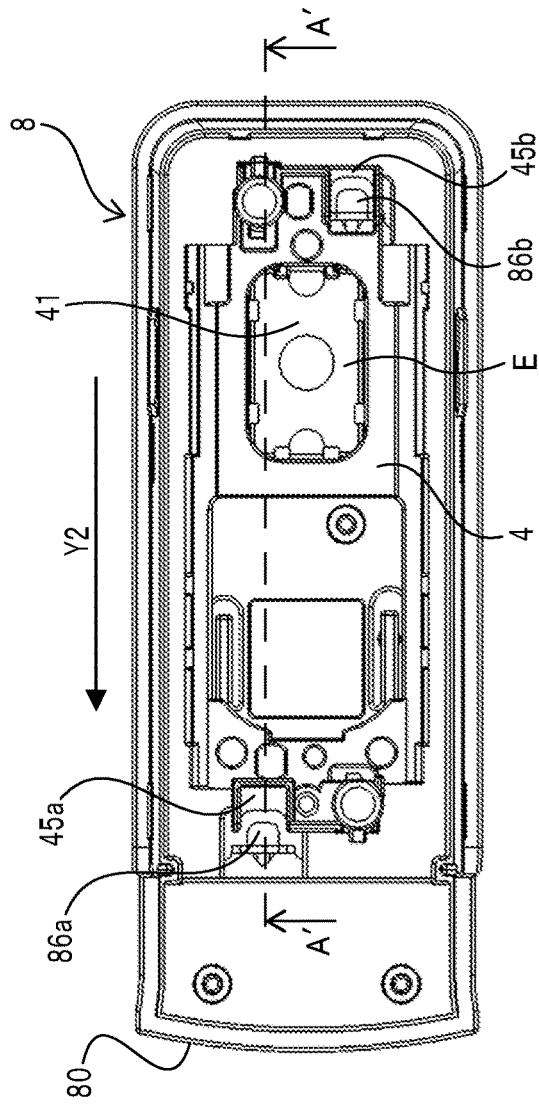
FIG. 15A is a top view illustrating only the spacer is placed on the bottom face part of the cover with the HMP body not installed, in a non-retaining state.
Figure 15B:
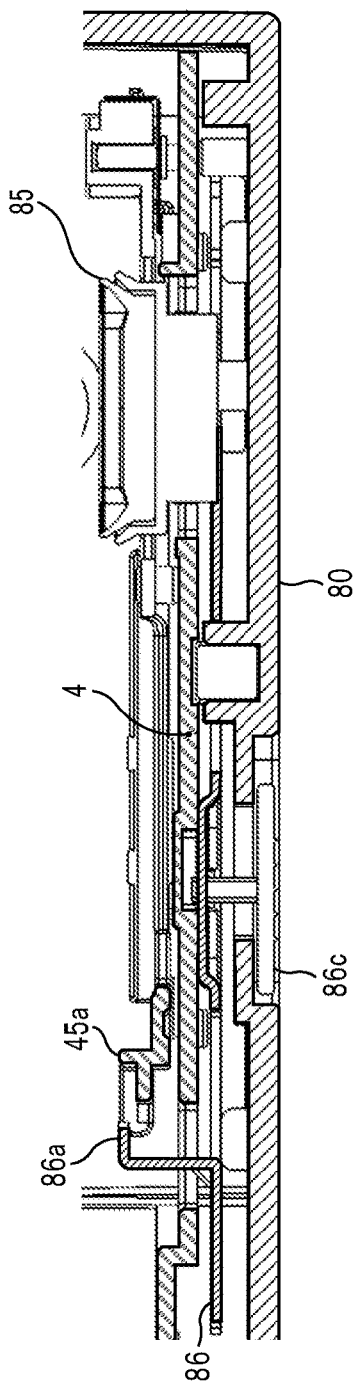
FIG. 15B is a cross-sectional view illustrating cross section A'-A' in FIG. 15A.

FIG. 15A is a top view illustrating only the spacer 4 is placed on the bottom face part 80 of the cover 8 without the HMP body 1 installed. FIG. 15B is a cross-sectional view illustrating cross-section A'-A' in FIG. 15A. FIGS. 15A and 15B each illustrate the HMP-body-side retaining state where the spacer 4 can be retained by the HMP body 1 (non-retaining state where the cover 8 does not retain the spacer 4). When the user performs slide operation of the slide operation part 86c in a Y2 direction in the figures, the slide lock 86 slides and moves in the Y2 direction in the figures in conjunction with the slide operation. After the slide lock 86 slides in the Y2 direction in the figures, as illustrated in FIG. 15B, the end of the lock part 86a on the slide lock 86 retracts to a position deviated from above the locked part 45a of the spacer 4. Similarly, the other lock part 86b retracts.

With the retraction of the lock parts 86a and 86b, the spacer 4 enters a non-locked state (non-engaged state) in which the locked parts 45a and 45b are not caught respectively by the ends of the lock parts 86a and 86b of the slide lock 86 of the cover 8. Thus, when the user pull out the HMP body 1 in the Z direction from the cover 8 in order to remove the cover 8 from the HMP body 1, the spacer 4 is removed together with the HMP body 1 from the cover 8, while the HMP body 1 is retaining the spacer 4 by magnetic force. As a result, after the pulling out of the HMP body 1 from the cover 8, the spacer 4 is attached to the recording face 30 of the HMP body 1 by the magnetic force.

Thus, when the HMP 10 is in the usable mode in which the rollers are not used (roller non-contact mode), the user performs the slide operation in the Y2 direction to pull out the HMP body 1 as illustrated in FIGS. 15A and 15B. After pulling out the HMP body 1, the user can obtain the HMP body 1 with the spacer 4 attached to the HMP body 1, and can perform image forming operation using the HMP body 1 to which the spacer 4 attached.

The cover 8 has magnetic bodies at positions respectively opposed to the magnets of the spacer 4 such that the cover 8 retains the spacer 4 by magnetic force. Thus, with the HMP body 1 not attached to the cover 8, even if the user performs slide operation of the slide operation part 86c in the Y2 direction in the figures to switch the spacer 4 from the locked state of FIGS. 14A and 14B to the non-locked state of FIGS. 15A and 15B, the spacer 4 is difficult to be removed from the cover 8. This difficulty in removal can prevent the spacer 4 from falling from the cover 8, when the side of the cover 8 into which the HMP body 1 is inserted is turned down. In addition, with the spacer 4 and the cover 8 attached to the HMP body 1 in the non-locked state of FIGS. 15A and 15B, the magnetic force between the HMP body 1 and the spacer 4 is larger than the magnetic force between the cover 8 and the spacer 4. Thus, after the removal of the cover 8 from the HMP body 1 in the state of FIGS. 15A and 15B, the spacer 4 is removed from the cover 8 while the spacer 4 is being attached to the HMP body 1.

Figure 16A:
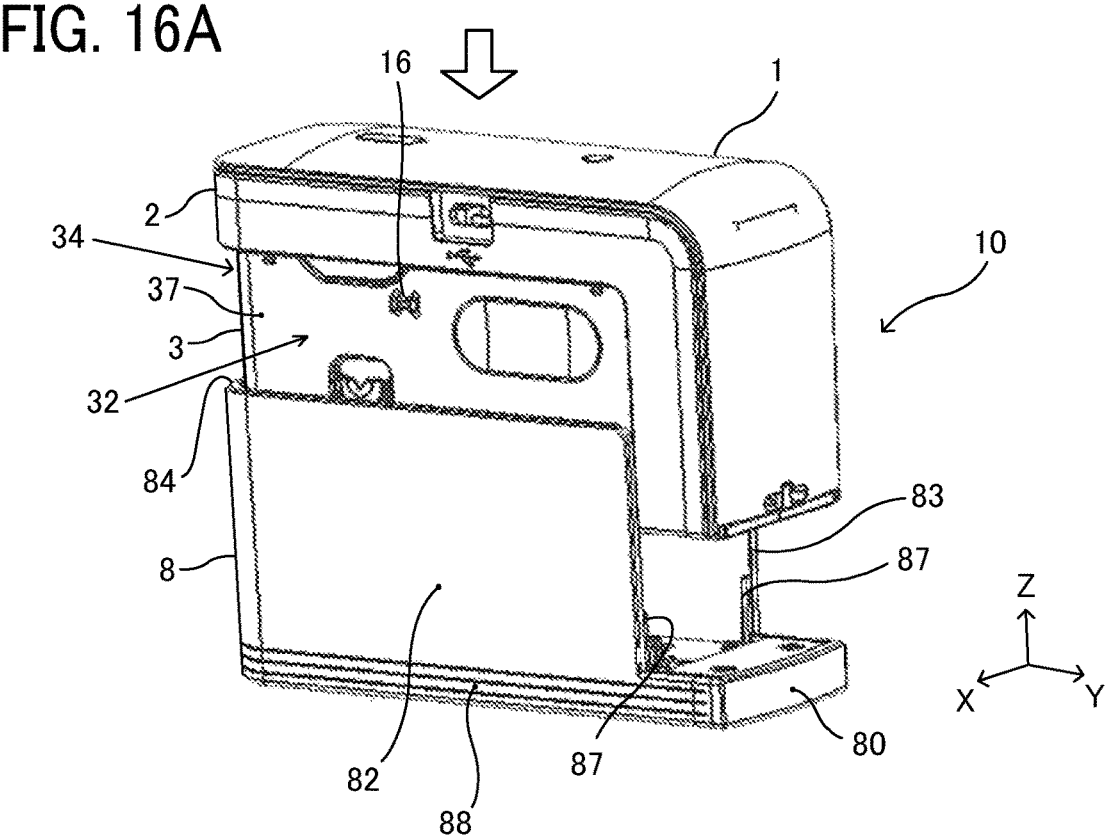
FIG. 16A is a perspective view illustrating a state in the middle of attachment movement in a case where the cover is correctly attached to the HMP body.
Figure 16B:
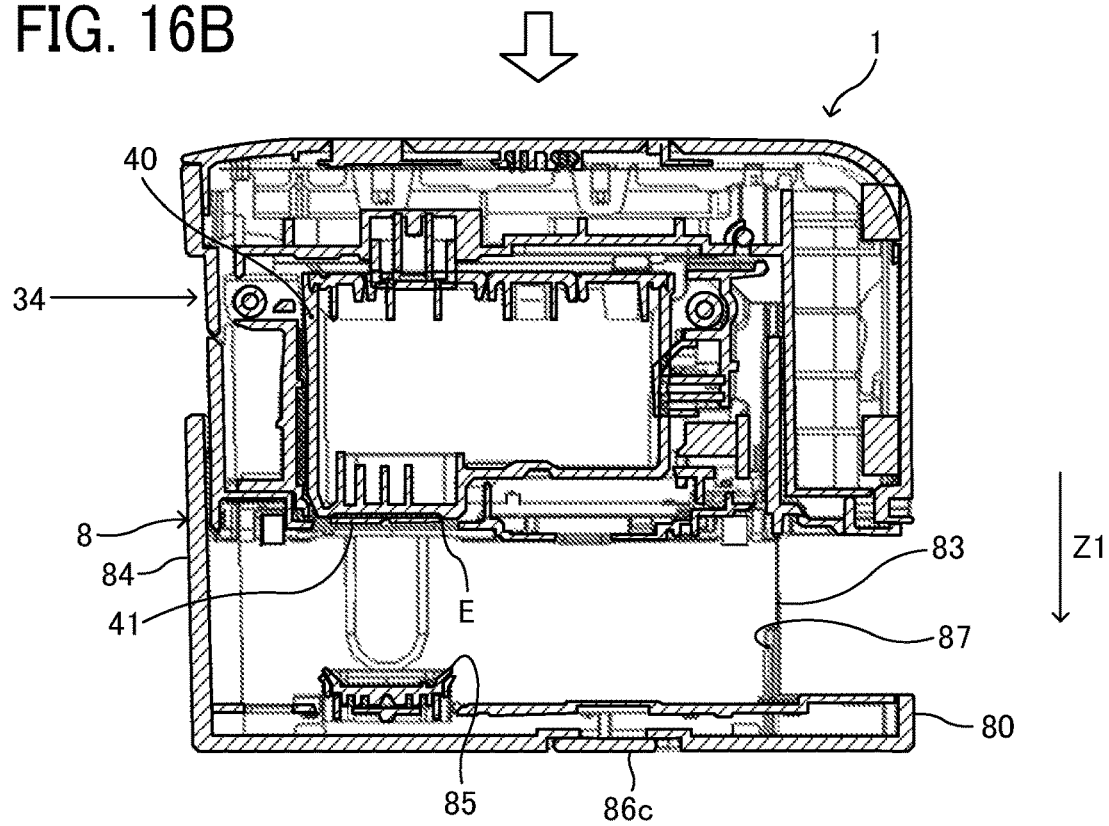
FIG. 16B is a cross-sectional view taken along a Y-Z plane in the state of FIG. 16A.

FIG. 16A is a perspective view illustrating a state in the middle of attachment movement in a case where the cover 8 is correctly attached to the HMP body 1. FIG. 16B is a cross-sectional view taken along a Y-Z plane in the state of FIG. 16A. In order to correctly attach the cover 8 to the HMP body 1, first, a position in an X direction (first direction) and a position in a Y direction (second direction) of the cover 8 with respect to the HMP body 1 are each determined as a target position where the edge of the cap 85 of the cover 8 is opposed to a regular contact location E above the recorder 41 of the inkjet head 40. After the determination, as illustrated in FIGS. 16A and 16B, the HMP body 1 and the cover 8 are relatively moved (moved to be attached) such that along a Z direction, the cap 85 of the cover 8 comes in straight contact with the recorder 41 of the inkjet head 40 in the HMP body 1. With such attachment operation, the two projections 16 provided on the HMP body 1 are caught by the two recesses 81 on the respective inner walls of the left and right wall face parts 82 and 83 of the cover 8, by snap-fit, and the cover 8 is attached to the HMP body 1.

In the present embodiment, after pulling out of the HMP body 1 from the cover 8 by the user, the projections 16 caught by snap-fit are released from recesses 81, respectively. Then, the user can remove the cover 8 from the HMP body 1. At this time, due to the pulling force by the user, when getting onto the respective side wall faces of the left and right wall face parts 82 and 83 of the cover 8 from the insides of the recesses 81 on the inner wall faces of the left and right wall face parts 82 and 83 of the cover 8, the respective projections 16 on the left and right side faces 32 and 33 of the HMP body 1 push the inner wall faces of the cover 8 to the outer wall face side of the cover 8. As a result, an upper portion of each of the left and right wall face parts 82 and 83 of the cover 8 warps for displacement of the upper portion to the outer wall face side of the cover 8. As described above, the warping of the upper portions on the left and right wall face parts 82 and 83 of the cover 8 can facilitate detachment, from the recesses 81, of the projections 16 respectively fitted inside the recesses 81. Thus, the engagement of the projections 16 and the recesses 81 is released properly.

However, when removing the cover 8 from the HMP body 1, in some cases, the user pinches with fingers and holds the upper portions on the left and right wall face parts 82 and 83 of the cover 8. In this held state, as indicated by arrows F in FIG. 17B, the upper portions (cover portions) of the left and right wall face parts 82 and 83 of the cover 8 is pressed toward the inner wall face side. Thus, warping of the upper portions of the cover 8 to the outer wall face side is hampered. As a result, even if the user applies pulling force, the projections 16 on the left and right side faces 32 and 33 of the HMP body 1 cannot be respectively detached easily from the recesses 81 on the inner wall faces of the left and right wall face parts 82 and 83 of the cover 8 and releasing of the engagement become difficult. As a result, the cover 8 cannot be removed from the HMP body 1 smoothly.

Therefore, in the present embodiment, as illustrated in FIG. 2, an uneven part 88 serving as a finger-applying-position indicator that indicates a position where the user applies the fingers of the user is formed on a side face portion of the bottom face part 80 on the outer wall face of the cover 8. Formation of such an uneven part 88 on the outer wall face of the cover 8 enables prompting, to the user, of application of the fingers of the user on the uneven part 88, when the user holds the cover 8. Namely, the position to which the fingers of the user are applied can be guided such that the user holds the uneven part 88 while applying the fingers of the user to the uneven part 88 on the side face of the bottom face part 80, instead of the upper portions on the left and right wall face parts 82 and 83 of the cover 8. The position where the uneven part 88 is formed is at a position deviated from the portion where the cover 8 warps when the cover 8 is removed from the HMP body 1 (upper portions on the left and right wall face parts 82 and 83 of the cover 8). Thus, in a case where the user applies the fingers of the user to the uneven part 88 to remove the cover 8 from the HMP body 1, warping of the cover 8 is not hampered and smooth removal can be implemented.

In the present embodiment, the position where the uneven part 88 is formed is required at least to be a position where warping of the cover 8 is not hampered in a case where the cover 8 is removed from the HMP body 1 with the fingers of the user applied to the uneven part 88, and the position can be set properly. For example, if most of warping of the cover 8 occurs at an upper half portion of the left and right wall face parts 82 and 83 of the cover 8, the uneven part 88 may be formed at a position of a lower half portion of the left and right wall face parts 82 and 83. However, as in the present embodiment, if the uneven part 88 is formed on the side face portion of the bottom face part 80 on the outer wall face of the cover 8, the uneven part 88 is at the position where the left and right wall face parts 82 and 83 do not warp due to the force generated by pressing with the fingers of the user. Thus, the formation of the uneven part 88 is favorable.

In addition, in the present embodiment, as illustrated in FIG. 17A, the uneven part 88 is disposed on the upstream side in a direction of attachment in which the cover 8 is attached to the HMP body 1, with respect to the portion where the cover 8 warps when the cover 8 is removed from the HMP body 1 (upper portions of the left and right wall face parts 82 and 83 of the cover 8). The downstream side in the direction of attachment of the left and right wall face parts 82 and 83 of the cover 8 is the side where the HMP body 1 is inserted when the cover 8 is attached to the HMP body 1. Thus, the left and right wall face parts 82 and 83 easily warp for displacement of the left and right wall face parts 82 and 83 to the outer wall face side of the cover. Therefore, disposition of the uneven part 88 on the upstream side in the direction of attachment with respect to the portion where the cover 8 warps facilitates implementation that the warping of the cover 8 is not hampered easily when the user applies the fingers of the user to the uneven part 88.

As in the present embodiment, one of the engaging portion and the engaged portion that engages with each other when the cover 8 is attached to the HMP body 1 serves as a recess and the other serves as a protrusion, so that snap-fit can be implemented with a simple configuration. Here, in the configuration in which the cover 8 is attached to or detached from the HMP body 1 by snap-fit, in a case where a protrusion and a recess respectively serve as the engaging portion and the engaged portion, the protrusion slides on a face of the counterpart member during removal of the cover. When the protrusion is worn by sliding, fitting into the recess becomes shallow, and the retaining force when the cover 8 is attached to the HMP body 1 is weakened. Thus, suppression of wear of the protrusion is required.

In the present embodiment, as illustrated in FIGS. 17A and 17B, the engaging portions (recesses 81) provided on the cover 8 side are disposed on a downstream side portion (upper portions) in the direction of attachment in which the left and right wall face parts 82 and 83 are likely to warp. In this configuration, the engaging portions (recesses 81) on the left and right wall face parts 82 and 83 of the cover 8 are relatively moved in contact with or close to the left and right side faces 32 and 33 of the HMP body 1, during the attachment operation of the cover 8 (specifically, during from the completion of inserting the HMP body 1 between the left and right wall face parts 82 and 83 of the cover 8 to the completion of the attachment). Thus, when the protrusion respectively serve as the engaging portions of the cover 8, the protrusions slide on the left and right side faces 32 and 33 of the HMP body 1 throughout the attachment operation. As a result, the wear of the protrusions is promoted. Similarly, during removal operation of the cover 8, the protrusions slide on the left and right side faces 32 and 33 of the HMP body 1 throughout the removal operation. As a result, the wear of the protrusions is promoted.

Therefore, in the present embodiment, each recess 81 serves as the engaging portion of the cover 8, and each projection 16 that is the protrusion serves as the engaged portion of the HMP body 1, the projection 16 being to engage with the recess 81. In this case, in the initial stage of the attachment operation of the cover 8 (specifically, during from the completion of inserting the HMP body 1 between the left and right wall face parts 82 and 83 of the cover 8 to reaching of the projections 16 to the respective upper ends of the left and right wall face parts 82 and 83 of the cover 8), the projections 16 serving as the protrusions of the HMP body 1 do not slide on the left and right wall face parts 82, and 83 of the cover 8. Thus, wear of the projections 16 serving as the protrusions can be restrained.

In addition, in order to restrain wear of the projections 16 serving as the protrusions, the projections 16 themselves or slid portions of the counterpart members on which the projections 16 slide (namely, upper inner-wall face portions of the left and right wall face parts 82 and 83 of the cover 8) may include low friction members, respectively. For examples, as the low friction members, the projections 16 themselves or the slid portions themselves of the counterpart members are each made in a material with friction lower than the material of a surrounding member. Alternatively, the low friction members may be each formed by sticking of a low friction member on the respective surfaces of the projections 16 or the slid portions of the counterpart members, or by application of a low-friction surface treatment to the projections 16 or the slid portions of the counterpart members. In the present embodiment, as illustrated in FIG. 12, as a low friction member, a sheet 89 made of nylon (registered trademark) is stuck on the respective upper inner-wall face portions of the left and right wall face parts 82 and 83 of the cover 8 on which the projections 16 of the HMP body 1 slides. The sheet 89 may be made in another material such as polyacetal (POM) or Teflon (registered trademark) as long as the sheet 89 exhibits a friction coefficient lower than the friction coefficient of respective base surfaces of the left and right wall face parts 82 and 83 of the cover 8, with respect to the projections 16.

Figure 18A:
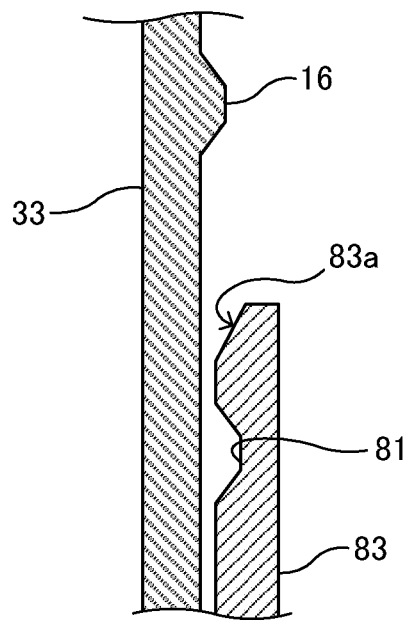
FIG. 18A is an enlarged cross-sectional view exemplary illustrating a chamfered surface provided on an upper end of a right wall face part of the cover.
Figure 18B:
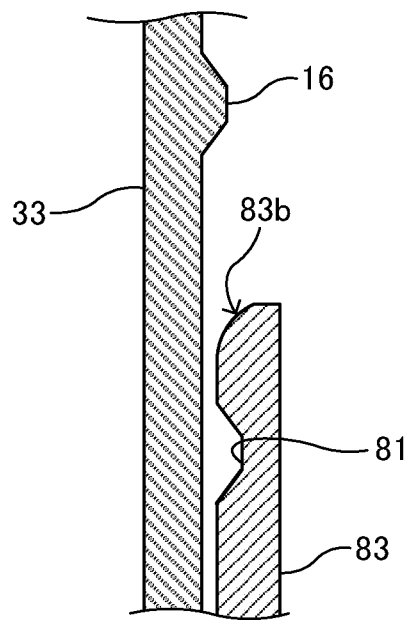
FIG. 18B is an enlarged cross-sectional view exemplary illustrating a rounded surface provide on the upper end of the right wall face part of the cover.

In addition, as illustrated in FIGS. 18A and 18B, the cover 8 of the present embodiment may be provide with a chamfered surface 83a (FIG. 18A) or a rounded surface 83b (FIG. 18B) at an end on the upstream side in the direction of attachment of the cover 8 with respect to the position of the recess 81 (namely, the respective upper ends of the left and right wall face parts 82 and 83 of the cover 8). Providing of the chamfered surface 83a or the rounded surface 83b makes smooth movement in which the projections 16 of the HMP body 1 come into contact with the upper ends of the left and right wall face parts 82 and 83 of the cover 8 and the projections 16 get onto the inner wall faces of the left and right wall face parts 82 and 83. As a result, the user operation in which the HMP body 1 is inserted between the left and right wall face parts 82 and 83 of the cover 8 is made smoothly.

In the present embodiment, the projections 16 serving as the engaged portions are respectively formed on the left and right side faces 32 and 33 of the HMP body 1 facing each other in a direction orthogonal to the direction of attachment or a direction of detachment of the cover 8. The recesses 81 serving as the engaging portions are formed on the inner wall faces of the left and right wall face parts 82 and 83 of the cover 8 respectively facing the left and right side faces 32 and 33 of the HMP body 1 when the cover 8 is attached to the HMP body 1. As described above, when the two projections 16 (or the two recesses 81) are respectively formed on the two sidewall faces facing each other, the user can apply the thumb of the user to one of the two sidewall faces and the remaining finger to the other. Thus, the user can hold the two sidewall faces easily. Therefore, the two recesses 81 of the cover 8 are pressed by the fingers of the user from the outer wall face side to the inner wall face side, and warping of the cover 8 is hampered when the cover 8 is removed. As a result, the cover 8 cannot be removed smoothly from the HMP body 1. According to the present embodiment, even with such a configuration that provides easy holding, the smooth removal of the cover 8 can be implemented by providing of the uneven part 88.

In particular, as in the present embodiment, in a case where the HMP body 1 has a substantially elongated cross-sectional shape orthogonal to the direction of attachment of the direction of detachment of the cover 8, when the projections 16 are provided on the left and right side faces 32 and 33 of the HMP body 1 (side faces facing in a lateral direction), the user can easily hold a position where the warping of the cover 8 is hampered when the cover 8 is removed. According to the present embodiment, even with such a configuration, providing of the uneven part 88 can implement the smooth removal of the cover 8.

The uneven part 88 of the present embodiment has an uneven shape formed with uneven portions arranged in direction of attachment or the direction of detachment of the cover 8. Thus, when the cover 8 is attached to or detached from the HMP body 1, the fingers of the user are caught on the uneven portions of the uneven part 88 and the fingers of the user are difficult to slip. That is, the uneven part 88 serving as the finger-applying-position indicator of the present embodiment has a function as a slippage prevention portion to prevent the fingers of the user from slipping. This function facilitates the operation of removing the cover 8 from the HMP body 1. The slippage prevention portion may include, for example, a high friction material that provides a surface state with a high coefficient of friction against the fingers of the user, different from such an uneven shape.

In the present embodiment, there is provided a guide that guides the movement of the cover 8 to the HMP body 1 is provided such that the recesses 81 are directed toward the projections 16 during the attachment movement of the cover 8 to the HMP body 1. Specifically, there are provided guides that position the cover 8 at a target position in the X direction with respect to the HMP body 1 and guide the cover 8. For example, as illustrated in FIGS. 16A and 16B, each guide of the present embodiment includes a guide projection 87 provided on the cover 8 and a guide groove 36 provided on the HMP body 1. The guide groove 36 guides the guide projection 87 along the Z direction while restricting the movement of the guide projection 87 in the Y direction.

The guide groove 36 provided on the HMP body 1 extends along the Z direction, and has a groove width (Y direction length) that is substantially the same as the Y direction length of the guide projection 87 of the cover 8 (length enough to form a slight clearance that allows the guide projection 87 to slide in the guide groove 36). Thus, entering of the guide projection 87 of the cover 8 into the guide groove 36 of the HMP body 1 causes both side parts in the Y direction of the guide projection 87 to come into contact with both inner side faces in the Y direction of the guide groove 36, and the movement in the Y direction is restricted. As a result, the position in the Y direction of the cover 8 with respect to the HMP body 1 is positioned at a target position in the Y direction.

The guide projections 87 of the present embodiment are respectively provided on the inner wall lower parts of the left and right wall face parts 82 and 83 of the cover. Thus, at the initial stage when the narrow part 37 of the HMP body 1 enters between the left and right wall face parts 82 and 83 of the cover 8 and positioning in the X direction is made, the guide projections 87 are located below the HMP body 1. As a result, the guide projections 87 do not enter into the guide grooves 36 of the HMP body 1. Therefore, in the present embodiment, after the narrow part 37 of the HMP body 1 enters between the left and right wall face parts 82 and 83 of the cover 8 and positioning in the X direction is made, the guide projections 87 enter into the guide grooves 36 and positioning in the Y direction is made.

As described above, positioning in the X direction and the Y direction by stages facilitates the user operation as compared with a case where the positioning in both of the directions is made simultaneously. As a result, user operation in which improper attachment movement that prevents the cover 8 from being correctly attached to the target position of the HMP body 1 is restrained. Thus, the projections 16 of the HMP body 1 properly fit into the recesses 81 of the cover 8 and the cover 8 can be correctly attached to the HMP body 1.

In the present embodiment, the engaged portions are formed on the outer wall faces of the left and right side faces 32 and 33 of the HMP body 1 (second member) covered with the upper portions (cover portions) on the left and right wall face parts 82 and 83 of the cover 8 (first member). The engaged portions serve as the protrusions including the projections 16 and the engaging portions that engage with the projections 16 serve as the recesses 81. However, the engaged portions may serve as recesses and the engaging portions may serve as protrusions. Note that, there is a case where formation of recesses on the outer wall face of the HMP body 1 is difficult due to the downsizing of the HMP body 1 (reduction in size in the X direction). In such a case, protrusions is favorably formed on the HMP body 1.

In the present embodiment, the example is taken in which the first member provided with the cover portions that cover the covered portion of the second member serves as the cover 8 (detachable member) and the second member serves as the HMP body 1 (body member). However, an example may be taken in which the first member serves as the HMP body 1 and the second member serves as the cover 8.

In addition, the finger-applying-position indicator in the present embodiment is the uneven part 88 having the function as the slippage prevention portion to prevent the fingers of the user from slipping. However, the finger-applying-position indicator may not have such a function as the slippage prevention section, as long as the finger-applying-position indicator indicates a position to which the fingers of the user are applied. Therefore, the finger-applying-position indicator may be a finger-applying-position indicator on which a seal including a character, a picture, or the like is attached as a display part that indicates a position to which the fingers of the user applied.

In the present embodiment, there has been described the example in which the present invention is applied to the inkjet-type HMP 10. However, the configuration of the present invention is also applicable to an apparatus using a different image forming method. For example, the present invention is applicable to a recording apparatus of an appropriate type such as a thermal type or a thermal transfer type. A thermal transfer type HMP body is provided with an ink ribbon serving as a storage container that stores a liquid. Thus, a recessed site may be formed at the bottom of the ink ribbon, and a position sensor serving as a detection device that detects a recording material may be accommodated in space included in the recessed site.

Furthermore, in the present embodiment, the description has been made in which as an article, the HMP 10 serving as the portable image forming apparatus is taken as the example. The present invention, however, is not particularly limited to such an article, as long as an article has a configuration in which the detachable member is detachably attached to the body member. Examples of the article include: various electronic devices each provided with a battery cover (detachable member) that is detachably attachable to the device body (body member); seals each provided with a cap (detachable member) that is detachably attachable to the seal body (body member); and writing tools, such as a ballpoint pen or an oil-based pen, each provided with a cap (detachable member) that is detachably attachable to the writing tool body (body member).

The above description is merely an example, and specific effects are exerted for each of the following aspects.

First Aspect

According to a first aspect, an article (for example, HMP 10) includes a body member (for example, HMP body 1) and a detachable member (for example, cover 8) to be detachably attached to the body member. One (for example, cover 8) of the body member and the detachable member includes a cover portion (for example, each of the left and right wall face parts 82 and 83) having an engaging portion (for example, recess 81) on an inner wall face of the cover portion. The other (for example, HMP body 1) of the body member and the detachable member includes a covered portion (for example, each of the left and right side faces 32 and 33) that is covered with the cover portion and that has an engaged portion (for example, projection 16) on an outer wall face of the covered portion. The detachable member is attached to the body member with the engaged portion being engaged with the engaging portion. The engaging portion and the engaged portion are configured to be disengaged by warping the cover portion so that the cover portion displaces to an outer wall face side of the cover portion. The one of the body member and the detachable member includes a finger-applying-position indicator (for example, uneven part 88) at a position deviated from a portion corresponding to the cover portion, on an outer wall face of the one of the body member and the detachable member. The finger-applying-position indicator indicates a position to be applied with fingers of a user. In this aspect, the cover portion included in the one of the body member and the detachable member is to cover the covered portion of the other of the body member and the detachable member, and the cover portion warps so that the cover portion displaces to the outer wall face side of the cover portion. As a result, the engagement between the engaging portion of the cover portion and the engaged portion of the covered portion is released. In such a configuration, if a user presses a portion on the outer wall face side of the cover portion with fingers to detach the detachable member from the body member, the cover portion would be difficult to be warped to the outer wall face side of the cover. As a result, the engagement between the engaging portion and the engaged portion would be difficult to be released, thus, hampering the detachable member from be smoothly removed from the body member. Therefore, in this aspect, the finger-applying-position indicator indicating the position to which the fingers of the user is applied is provided at the position deviated from the portion corresponding to the cover portion, on the outer wall face of the one of the body member and the detachable member having the cover portion on the inner wall face of the one of the body member and the detachable member. Providing of the finger-applying-position indicator enables guiding the position to which the user applies the fingers of the user when the detachable member is removed from the body member, to the position deviated from the portion corresponding to the cover portion. As a result, when the detachable member is removed from the body member, the portion on the outer wall face side of the cover portion is prevented from being pressed by the fingers of the user, and occurrence of a situation where the detachable member cannot be removed smoothly from the body member can be restrained.

Second Aspect

According to a second aspect, in the first aspect, the finger-applying-position indicator is disposed on an upstream side from the cover portion in a direction of attachment of the detachable member to the body member. A downstream side form the cover portion of the one of the detachable member and the body member in the direction of attachment is a side into which the other of the detachable member and the body member including the covered portion enters when the detachable member is attached. Thus, the cover portion can easily warp so that the cover portion displaces to the outer wall face side. Therefore, disposing the finger-applying-position indicator on the upstream side in the direction of attachment with respect to the cover portion (portion to warp) facilitates the warping of the cover portion and even if the user applies the fingers of the user to the finger-applying-position indicator, a configuration in which the warping of the cover portion is not hampered easily can be implemented easily.

Third Aspect

According to a third aspect, in the first aspect or the second aspect, the engaging portion (for example, recess 81) is one of a recess and a protrusion, and the engaged portion (for example, projection 16) is the other of the recess and the protrusion to fit with the one of the recess and the protrusion. According to the third aspect, snap-fit can be implemented with a simple configuration.

Fourth Aspect

According to a fourth aspect, in the third aspect, the engaging portion (for example, recess 81) is disposed on a downstream portion in a direction of attachment of the detachable member on the inner wall face of the one (for example, cover 8) of the body member and the detachable member and the engaging portion is the recess and the engaged portion (for example, projection 16) is the protrusion. According to the fourth aspect, when the detachable member is attached to or detached to the body member, the distance that the engaged portion serving as the protrusion slides on the inner wall face of the one of the body member and the detachable member on which the engaging portion serving as the recess is formed is shortened. As a result, wear of the protrusion (engaged portion) can be easily restrained.

Fifth Aspect

According to a fifth aspect, in the third aspect or the fourth aspect, the first protrusion slides on a slid portion of a counterpart member when the detachable member is attached to or detached from the body member. At least one of the slid portion and the protrusion includes a low friction member (for example, sheet 89). According to the fifth aspect, wear of the protrusion (engaged portion) can be restrained.

Sixth Aspect

According to a sixth aspect, in any of the third to fifth aspects, one member of the body member and the detachable member on which the first recess is formed has a chamfered or rounded surface on an end upstream from the recess in the direction of attachment of the detachable member. According to the sixth embodiment, the movement in which the protrusion comes into contact with the end of the counterpart member and the protrusion gets onto the inner wall face or the outer wall face on which the recess is formed becomes smooth. As a result, the user operation in which the detachable member to the body member is made smoothly.

Seventh Aspect

According to a seventh aspect, in any of the first to sixth aspects, the engaged portion (for example, projection 16) is formed on each of two outer sidewall faces (for example, the left and right side faces 32 and 33 of the HMP body 1) facing each other in a direction orthogonal to a direction of attachment or a direction of detachment of the detachable member, and the engaging portion (for example, recess 81) is formed on each of two inner sidewall faces (for example, the inner wall faces of the left and right wall face parts 82 and 83 of the cover 8) that respectively face the two outer sidewall faces when the detachable member is attached to the body member. As in the present aspect, in the configuration in which the engaged portion and the engaging portion are formed on the two outer sidewall faces or the two inner sidewall faces facing each other, the user can apply the thumb of the user to one of the two sidewall faces and the remaining finger to the other. Thus, the user can hold the two sidewall faces easily. Therefore, when the detachable member is removed from the body member, the user presses both of the outer wall face sides of the cover portion with the fingers of the user. As a result, the cover portion may be difficult to warp to the outer wall face side of the cover. According to the present aspect, even in such a configuration, the smooth removal of the detachable member can be implemented by providing of the finger-applying-position indicator.

Eighth Aspect

According to an eighth aspect, in the seventh aspect, the one of the body member and the detachable member is the detachable member (for example, cover 8), the other of the body member and the detachable member is the body member (for example, the HMP body 1). The body member has an elongated cross-sectional shape orthogonal to the direction of attachment or the direction of detachment of the detachable member, and the two outer sidewall faces face each other in a lateral direction of the body member. According to the present aspect, the user is likely to hold the position where the warping may be hampered when the detachable member is removed from the body member. However, even in such a configuration, the smooth removal of the detachable member can be implemented by providing of the finger-applying-position indicator.

Ninth Aspect

According to a ninth aspect, in any of the first to eighth aspects, the finger-applying-position indicator includes a slippage prevention portion to prevent the fingers of the user from slipping. According to the ninth embodiment, the user operation in which the detachable member is removed from the body member becomes easy.

Tenth Aspect

According to a tenth aspect, in any of the first to ninth aspects, the articles includes a guide (for example, each of the guide groove 36 and the guide projection 87) to guide movement of the detachable member to the body member such that the engaging portion is directed toward the engaged portion during attachment movement of the detachable member to the body member. According to the present aspect, appropriate attachment of the engaging portion and the engaged portion) can be implemented.

Eleventh Aspect

According to an eleventh aspect, in any of the first to tenth aspects, the article is a portable image forming apparatus (for example, HMP 10). According to the present aspect, there can be provided the portable image forming apparatus that prevents, when the detachable member is removed from the body member, the portion on the outer wall face side of the cover portion from being pressed by the fingers of the user, and can restrain occurrence of a situation where the detachable member cannot be removed smoothly from the body member.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An article, comprising:
a body; and
a cover that is detachably attached to the body along a direction of attachment, wherein
the cover includes a plurality of side walls,
the direction of attachment is within a plane of each side wall of the plurality of side walls
the cover includes a recess on an inner wall face of at least one side wall of the plurality of side walls,
the body includes a side wall face that is covered with the cover, the side wall face including a projection on the side wall face,
the cover is attached to the body in a case that the projection is engaged into the recess,
the projection is disengaged from the recess by warping the cover so that the cover displaces to an outer wall face side of a side wall of the plurality of side walls and in a direction different from the direction of attachment, and
the cover includes a finger-applying-position indicator on an outer wall face of the cover, the finger-applying-position indicator indicating a position to be applied with a finger of a user.

2. The article according to claim 1, wherein the finger-applying-position indicator is upstream from the cover in the direction of attachment of the detachable to the body.

3. The article according to claim 1, wherein
the recess is on a downstream portion in the direction of attachment of the cover on the inner wall face of the cover.

4. The article according to claim 1, wherein
the projection is configured to slide on a slide portion of cover when the cover is attached to and detached from the body, and
at least one of the slide portion and the projection has a lower friction than a surrounding portion of the at least one of the slide portion and the projection.

5. The article according to claim 1, wherein one of the body and the cover has a chamfered or rounded surface on an end upstream from the recess in the direction of attachment of the cover.

6. The article according to claim 1, wherein
the projection is on each of two outer side wall faces of the body facing each other in a direction orthogonal to the direction of attachment of the cover, and
the recess is on each of two inner side wall faces of the cover that respectively face the two outer side wall faces in a case that the cover is attached to the body.

7. The article according to claim 6, wherein
the body has an elongated cross-sectional shape orthogonal to the direction of attachment of the detachable, and
the two outer side wall faces face each other in a lateral direction of the body.

8. The article according to claim 1, wherein the finger-applying-position indicator has an uneven shape in which uneven portions are arranged side by side in the direction of attachment.

9. The article according to claim 1, further comprising a guide configured to guide movement of the cover to the body such that the recess is directed toward the projection during attachment movement of the cover to the body.

10. The article according to claim 1, wherein the article is a portable image forming apparatus.

11. An article, comprising:
a body; and
a cover that is detachably attached to the body along a direction of attachment, wherein
the cover includes a plurality of side walls,
the direction of attachment is within a plane of each of each side wall of the plurality of side walls,
the cover includes a projection on an inner wall face of at least one side wall of the plurality of side walls,
the body includes a side wall face that is covered with the cover, the side wall face including a recess on the side wall face,
the cover is attached to the body in a case that the projection is engaged into the recess,
the projection is disengaged from the recess by warping the cover so that the cover displaces to an outer wall face side of a side wall of the plurality of side walls and in a direction different from the direction of attachment, and
the cover includes a finger-applying-position indicator on an outer wall face of the cover, the finger-applying-position indicator indicating a position to be applied with a finger of a user.

12. The article according to claim 11, wherein the finger-applying-position indicator is upstream from the cover in the direction of attachment of the detachable to the body.

13. The article according to claim 11, wherein the projection is on a downstream portion in the direction of attachment of the cover on the inner wall face of the cover.

14. The article according to claim 11, wherein
the projection is configured to slide on a slide portion of body when the cover is attached to and detached from the body, and
at least one of the slide portion and the projection has a lower friction than a surrounding portion of the at least one of the slide portion and the projection.

15. The article according to claim 11, wherein one of the body and the cover has a chamfered or rounded surface on an end upstream from the projection in the direction of attachment of the cover.

16. The article according to claim 11, wherein
the recess is on each of two outer side wall faces of the body facing each other in a direction orthogonal to the direction of attachment of the cover, and
the projection is on each of two inner side wall faces of the cover that respectively face the two outer sidewall faces in a case that the cover is attached to the body.

17. The article according to claim 16, wherein
the body has an elongated cross-sectional shape orthogonal to the direction of attachment of the detachable, and
the two outer side wall faces face each other in a lateral direction of the body.

18. The article according to claim 11, wherein the finger-applying-position indicator has an uneven shape in which uneven portions are arranged side by side in the direction of attachment.

19. The article according to claim 11, further comprising a guide configured to guide movement of the cover to the body such that the projection is directed toward the recess during attachment movement of the cover to the body.

20. A handheld mobile printer, comprising:
a body holding an inkjet head, the body to be moved in a scanning direction in order for the inkjet head to form an image on a recording material; and
a cover that is detachably attached to the body to cover the inkjet head and two side walls of the body, the two side walls being located on two sides of the body in the scanning direction, wherein
a side wall of the body has a projection,
the cover includes at least two side walls, each having a recess to engage with the projection, and a direction of attachment of the cover to the body is within a plane of each side wall of the two side walls of the cover,
the projection is disengaged from the recess by warping the cover so that the cover displaces to an outer wall face side of a side wall of the at least two side walls of the cover and in a direction different from the direction of attachment, and
an outer wall face of the cover includes a finger-applying-position indicator at a position different from a position of the recess in the direction of attachment, the finger-applying-position indicator indicating a position to be applied with a finger of a user.

* * * * *